(12) United States Patent
Vedam et al.

(10) Patent No.: US 10,999,200 B2
(45) Date of Patent: May 4, 2021

(54) OFFLINE, INTELLIGENT LOAD BALANCING OF SCTP TRAFFIC

(71) Applicant: Extreme Networks, Inc., San Jose, CA (US)

(72) Inventors: Jude Pragash Vedam, Bangalore (IN); Suresh Paruchuri, Bangalore (IN); Deepak Hegde, Bangalore (IN)

(73) Assignee: Extreme Networks, Inc., San Jose, CA (US)

( * ) Notice: Subject to any disclaimer, the term of this patent is extended or adjusted under 35 U.S.C. 154(b) by 568 days.

(21) Appl. No.: 15/336,333

(22) Filed: Oct. 27, 2016

(65) Prior Publication Data

US 2017/0279723 A1 Sep. 28, 2017

(30) Foreign Application Priority Data

Mar. 24, 2016 (IN) .............................. 201641010295

(51) Int. Cl.
*H04L 12/803* (2013.01)
*H04L 12/26* (2006.01)

(52) U.S. Cl.
CPC .......... *H04L 47/125* (2013.01); *H04L 43/062* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 5,031,094 A | 7/1991 | Toegel et al. | |
| 5,359,593 A | 10/1994 | Derby et al. | |
| 5,948,061 A | 9/1999 | Merriman et al. | |
| 5,951,634 A | 9/1999 | Sitbon et al. | |
| 6,006,269 A | 12/1999 | Phaal | |
| 6,006,333 A | 12/1999 | Nielsen | |

(Continued)

FOREIGN PATENT DOCUMENTS

| | | |
|---|---|---|
| CN | 101677292 B | 3/2010 |
| EP | 2654340 A1 | 10/2013 |

(Continued)

OTHER PUBLICATIONS

Armando et al., SCTP: A Proposed Standard for Robust Internet Data Transport; Nov. 2003, IEEE, Computer (vol. 36) (Year: 2003).*

(Continued)

*Primary Examiner* — Jeffrey M Rutkowski
*Assistant Examiner* — Ning Li
(74) *Attorney, Agent, or Firm* — Sterne, Kessler, Goldstein & Fox P.L.L.C.

(57) ABSTRACT

Techniques for enabling offline, intelligent load balancing of Stream Control Transmission Protocol (SCTP) traffic are provided. According to one embodiment, a load balancer can receive one or more SCTP packets that have been replicated from a network being monitored. The load balancer can further recover an SCTP message from the one or more SCTP packets and can map the SCTP message to an egress port based on one or more parameters decoded from the SCTP message and one or more rules. The load balancer can then transmit the SCTP message out of the egress port towards an analytic probe or tool for analysis.

20 Claims, 10 Drawing Sheets

(56) References Cited

U.S. PATENT DOCUMENTS

| | | |
|---|---|---|
| 6,078,956 A | 6/2000 | Bryant et al. |
| 6,092,178 A | 7/2000 | Jindal et al. |
| 6,112,239 A | 8/2000 | Kenner et al. |
| 6,115,752 A | 9/2000 | Chauhan |
| 6,128,279 A | 10/2000 | O'Neil et al. |
| 6,128,642 A | 10/2000 | Doraswamy et al. |
| 6,148,410 A | 11/2000 | Baskey et al. |
| 6,167,445 A | 12/2000 | Gai et al. |
| 6,167,446 A | 12/2000 | Lister et al. |
| 6,182,139 B1 | 1/2001 | Brendel |
| 6,195,691 B1 | 2/2001 | Brown |
| 6,205,477 B1 | 3/2001 | Johnson et al. |
| 6,233,604 B1 | 5/2001 | Van Horne et al. |
| 6,260,070 B1 | 7/2001 | Shah |
| 6,286,039 B1 | 9/2001 | Van Horne et al. |
| 6,286,047 B1 | 9/2001 | Ramanathan et al. |
| 6,304,913 B1 | 10/2001 | Rune |
| 6,324,580 B1 | 11/2001 | Jindal et al. |
| 6,327,622 B1 | 12/2001 | Jindal et al. |
| 6,336,137 B1 | 1/2002 | Lee et al. |
| 6,381,627 B1 | 4/2002 | Kwan et al. |
| 6,389,462 B1 | 5/2002 | Cohen et al. |
| 6,427,170 B1 | 7/2002 | Sitaraman et al. |
| 6,434,118 B1 | 8/2002 | Kirschenbaum |
| 6,438,652 B1 | 8/2002 | Jordan et al. |
| 6,446,121 B1 | 9/2002 | Shah et al. |
| 6,449,657 B2 | 9/2002 | Stanbach, Jr. et al. |
| 6,470,389 B1 | 10/2002 | Chung et al. |
| 6,473,802 B2 | 10/2002 | Masters |
| 6,480,508 B1 | 11/2002 | Mwikalo et al. |
| 6,490,624 B1 | 12/2002 | Sampson et al. |
| 6,549,944 B1 | 4/2003 | Weinberg et al. |
| 6,567,377 B1 | 5/2003 | Vepa et al. |
| 6,578,066 B1 | 6/2003 | Logan et al. |
| 6,606,643 B1 | 8/2003 | Emens et al. |
| 6,665,702 B1 | 12/2003 | Zisapel et al. |
| 6,671,275 B1 | 12/2003 | Wong et al. |
| 6,681,232 B1 | 1/2004 | Sitanizadeh et al. |
| 6,681,323 B1 | 1/2004 | Fontsnesi et al. |
| 6,691,165 B1 | 2/2004 | Bruck et al. |
| 6,697,368 B2 | 2/2004 | Chang et al. |
| 6,735,218 B2 | 5/2004 | Chang et al. |
| 6,745,241 B1 | 6/2004 | French et al. |
| 6,751,616 B1 | 6/2004 | Chan |
| 6,754,706 B1 | 6/2004 | Swildens et al. |
| 6,772,211 B2 | 8/2004 | Lu et al. |
| 6,779,017 B1 | 8/2004 | Lamberton et al. |
| 6,789,125 B1 | 9/2004 | Aviani et al. |
| 6,821,891 B2 | 11/2004 | Chen et al. |
| 6,826,198 B2 | 11/2004 | Turina et al. |
| 6,831,891 B2 | 12/2004 | Mansharamani et al. |
| 6,839,700 B2 | 1/2005 | Doyle et al. |
| 6,850,984 B1 | 2/2005 | Kalkunte et al. |
| 6,874,152 B2 | 3/2005 | Vermeire et al. |
| 6,879,995 B1 | 4/2005 | Chinta et al. |
| 6,898,633 B1 | 5/2005 | Lyndersay et al. |
| 6,901,072 B1 | 5/2005 | Wong |
| 6,901,081 B1 | 5/2005 | Ludwig |
| 6,920,498 B1 | 7/2005 | Gourlay et al. |
| 6,928,485 B1 | 8/2005 | Krishnamurthy et al. |
| 6,944,678 B2 | 9/2005 | Lu et al. |
| 6,963,914 B1 | 11/2005 | Breitbart et al. |
| 6,963,917 B1 | 11/2005 | Callis et al. |
| 6,985,956 B2 | 1/2006 | Luke et al. |
| 6,987,763 B2 | 1/2006 | Rochberger et al. |
| 6,996,615 B1 | 2/2006 | McGuire |
| 6,996,616 B1 | 2/2006 | Leighton et al. |
| 7,000,007 B1 | 2/2006 | Valenti |
| 7,009,086 B2 | 3/2006 | Brown et al. |
| 7,009,968 B2 | 3/2006 | Ambe et al. |
| 7,020,698 B2 | 3/2006 | Andrews et al. |
| 7,020,714 B2 | 3/2006 | Kalyanaraman et al. |
| 7,028,083 B2 | 4/2006 | Levine et al. |
| 7,031,304 B1 | 4/2006 | Arberg et al. |
| 7,032,010 B1 | 4/2006 | Swildens et al. |
| 7,036,039 B2 | 4/2006 | Holland |
| 7,058,706 B1 | 6/2006 | Iyer et al. |
| 7,058,717 B2 | 6/2006 | Chao et al. |
| 7,062,642 B1 | 6/2006 | Langrind et al. |
| 7,086,061 B1 | 8/2006 | Joshi et al. |
| 7,089,293 B2 | 8/2006 | Grosner et al. |
| 7,095,738 B1 | 8/2006 | Desanti |
| 7,117,530 B1 | 10/2006 | Lin |
| 7,126,910 B1 | 10/2006 | Sridhar |
| 7,127,713 B2 | 10/2006 | Davis et al. |
| 7,136,932 B1 | 11/2006 | Schneider |
| 7,139,242 B2 | 11/2006 | Bays |
| 7,177,933 B2 | 2/2007 | Foth |
| 7,177,943 B1 | 2/2007 | Temoshenko et al. |
| 7,185,052 B2 | 2/2007 | Day |
| 7,187,687 B1 | 3/2007 | Davis et al. |
| 7,188,189 B2 | 3/2007 | Karol et al. |
| 7,197,547 B1 | 3/2007 | Miller et al. |
| 7,206,806 B2 | 4/2007 | Pineau |
| 7,215,637 B1 | 5/2007 | Ferguson et al. |
| 7,225,272 B2 | 5/2007 | Kelley et al. |
| 7,240,015 B1 | 7/2007 | Karmouch et al. |
| 7,240,100 B1 | 7/2007 | Wein et al. |
| 7,254,626 B1 | 8/2007 | Kommula et al. |
| 7,257,642 B1 | 8/2007 | Bridger et al. |
| 7,260,645 B2 | 8/2007 | Bays |
| 7,266,117 B1 | 9/2007 | Davis |
| 7,266,120 B2 | 9/2007 | Cheng et al. |
| 7,277,954 B1 | 10/2007 | Stewart et al. |
| 7,292,573 B2 | 11/2007 | LaVigne et al. |
| 7,296,088 B1 | 11/2007 | Padmanabhan et al. |
| 7,321,926 B1 | 1/2008 | Zhang et al. |
| 7,424,018 B2 | 9/2008 | Gallatin et al. |
| 7,436,832 B2 | 10/2008 | Gallatin et al. |
| 7,440,467 B2 | 10/2008 | Gallatin et al. |
| 7,441,045 B2 | 10/2008 | Skene et al. |
| 7,450,527 B2 | 11/2008 | Ashwood Smith |
| 7,454,500 B1 | 11/2008 | Hsu et al. |
| 7,483,374 B2 | 1/2009 | Nilakantan et al. |
| 7,492,713 B1 | 2/2009 | Turner et al. |
| 7,506,065 B2 | 3/2009 | LaVigne et al. |
| 7,539,134 B1 | 5/2009 | Bowes |
| 7,555,562 B2 | 6/2009 | See et al. |
| 7,558,195 B1 | 7/2009 | Kuo et al. |
| 7,574,508 B1 | 8/2009 | Kommula |
| 7,581,009 B1 | 8/2009 | Hsu et al. |
| 7,584,301 B1 | 9/2009 | Joshi |
| 7,587,487 B1 | 9/2009 | Gunturu |
| 7,606,203 B1 | 10/2009 | Shabtay et al. |
| 7,647,427 B1 | 1/2010 | Devarapalli |
| 7,657,629 B1 | 2/2010 | Kommula |
| 7,690,040 B2 | 3/2010 | Frattura et al. |
| 7,706,363 B1 | 4/2010 | Daniel et al. |
| 7,716,370 B1 | 5/2010 | Devarapalli |
| 7,720,066 B2 | 5/2010 | Weyman et al. |
| 7,720,076 B2 | 5/2010 | Dobbins et al. |
| 7,746,789 B2 | 6/2010 | Katoh et al. |
| 7,747,737 B1 | 6/2010 | Apte et al. |
| 7,756,965 B2 | 7/2010 | Joshi |
| 7,774,833 B1 | 8/2010 | Szeto et al. |
| 7,787,454 B1 | 8/2010 | Won et al. |
| 7,792,047 B2 | 9/2010 | Gallatin et al. |
| 7,835,348 B2 | 11/2010 | Kasralikar |
| 7,835,358 B2 | 11/2010 | Gallatin et al. |
| 7,840,678 B2 | 11/2010 | Joshi |
| 7,848,326 B1 | 12/2010 | Leong et al. |
| 7,889,748 B1 | 2/2011 | Leong et al. |
| 7,899,899 B2 | 3/2011 | Joshi |
| 7,940,766 B2 | 5/2011 | Olakangil et al. |
| 7,953,089 B1 | 5/2011 | Ramakrishnan et al. |
| 8,018,943 B1 | 9/2011 | Pleshek et al. |
| 8,208,494 B2 | 6/2012 | Leong |
| 8,238,344 B1 | 8/2012 | Chen et al. |
| 8,239,960 B2 | 8/2012 | Frattura et al. |
| 8,248,928 B1 | 8/2012 | Wang et al. |
| 8,270,845 B2 | 9/2012 | Cheung et al. |
| 8,315,256 B2 | 11/2012 | Leong et al. |
| 8,386,846 B2 | 2/2013 | Cheung |
| 8,391,286 B2 | 3/2013 | Gallatin et al. |

(56) References Cited

U.S. PATENT DOCUMENTS

| | | |
|---|---|---|
| 8,504,721 B2 | 8/2013 | Hsu et al. |
| 8,514,718 B2 | 8/2013 | Zijst |
| 8,537,697 B2 | 9/2013 | Leong et al. |
| 8,570,862 B1 | 10/2013 | Leong et al. |
| 8,615,008 B2 | 12/2013 | Natarajan et al. |
| 8,654,651 B2 | 2/2014 | Leong et al. |
| 8,824,466 B2 | 9/2014 | Won et al. |
| 8,830,819 B2 | 9/2014 | Leong et al. |
| 8,873,557 B2 | 10/2014 | Nguyen |
| 8,891,527 B2 | 11/2014 | Wang |
| 8,897,138 B2 | 11/2014 | Yu et al. |
| 8,953,458 B2 | 2/2015 | Leong et al. |
| 9,155,075 B2 | 10/2015 | Song et al. |
| 9,264,446 B2 | 2/2016 | Goldfarb et al. |
| 9,270,566 B2 | 2/2016 | Wang et al. |
| 9,270,592 B1 | 2/2016 | Sites |
| 9,294,367 B2 | 3/2016 | Natarajan et al. |
| 9,356,866 B1 | 5/2016 | Sivaramakrishnan et al. |
| 9,380,002 B2 | 6/2016 | Johansson et al. |
| 9,479,415 B2 | 10/2016 | Natarajan et al. |
| 9,565,138 B2 | 2/2017 | Chen et al. |
| 9,648,542 B2 | 5/2017 | Hsu et al. |
| 2001/0049741 A1 | 12/2001 | Skene et al. |
| 2001/0052016 A1 | 12/2001 | Skene et al. |
| 2002/0009081 A1 | 1/2002 | Sampath et al. |
| 2002/0018796 A1 | 2/2002 | Wironen |
| 2002/0023089 A1 | 2/2002 | Woo |
| 2002/0026551 A1 | 2/2002 | Kamimaki et al. |
| 2002/0038360 A1 | 3/2002 | Andrews et al. |
| 2002/0055939 A1 | 5/2002 | Nardone et al. |
| 2002/0059170 A1 | 5/2002 | Vange |
| 2002/0059464 A1 | 5/2002 | Hata et al. |
| 2002/0062372 A1 | 5/2002 | Hong et al. |
| 2002/0078233 A1 | 6/2002 | Biliris et al. |
| 2002/0091840 A1 | 7/2002 | Pulier et al. |
| 2002/0112036 A1 | 8/2002 | Bohannan et al. |
| 2002/0120743 A1 | 8/2002 | Shabtay et al. |
| 2002/0124096 A1 | 9/2002 | Loguinov et al. |
| 2002/0133601 A1 | 9/2002 | Kennamer et al. |
| 2002/0150048 A1 | 10/2002 | Ha et al. |
| 2002/0154600 A1 | 10/2002 | Ido et al. |
| 2002/0188862 A1 | 12/2002 | Trethewey et al. |
| 2002/0194324 A1 | 12/2002 | Guha |
| 2002/0194335 A1 | 12/2002 | Maynard |
| 2003/0023744 A1 | 1/2003 | Sadot et al. |
| 2003/0031185 A1 | 2/2003 | Kikuchi et al. |
| 2003/0035430 A1 | 2/2003 | Islam et al. |
| 2003/0065711 A1 | 4/2003 | Acharya et al. |
| 2003/0065763 A1 | 4/2003 | Swildens et al. |
| 2003/0105797 A1 | 6/2003 | Dolev et al. |
| 2003/0115283 A1 | 6/2003 | Barbir et al. |
| 2003/0135509 A1 | 7/2003 | Davis et al. |
| 2003/0202511 A1 | 10/2003 | Sreejith et al. |
| 2003/0210686 A1 | 11/2003 | Terrell et al. |
| 2003/0210694 A1 | 11/2003 | Jayaraman et al. |
| 2003/0229697 A1 | 12/2003 | Borella |
| 2004/0019680 A1 | 1/2004 | Chao et al. |
| 2004/0024872 A1 | 2/2004 | Kelley et al. |
| 2004/0032868 A1 | 2/2004 | Oda et al. |
| 2004/0064577 A1 | 4/2004 | Dahlin et al. |
| 2004/0194102 A1 | 9/2004 | Neerdaels |
| 2004/0243718 A1 | 12/2004 | Fujiyoshi |
| 2004/0249939 A1 | 12/2004 | Amini et al. |
| 2004/0249971 A1 | 12/2004 | Klinker |
| 2005/0021883 A1 | 1/2005 | Shishizuka et al. |
| 2005/0033858 A1 | 2/2005 | Swildens et al. |
| 2005/0060418 A1 | 3/2005 | Sorokopud |
| 2005/0060427 A1 | 3/2005 | Phillips et al. |
| 2005/0086295 A1 | 4/2005 | Cunningham et al. |
| 2005/0149531 A1 | 7/2005 | Srivastava |
| 2005/0169180 A1 | 8/2005 | Ludwig |
| 2005/0190695 A1 | 9/2005 | Phaal |
| 2005/0207417 A1 | 9/2005 | Ogawa et al. |
| 2005/0278565 A1 | 12/2005 | Frattura et al. |
| 2005/0286416 A1 | 12/2005 | Shimonishi et al. |
| 2006/0036743 A1 | 2/2006 | Deng et al. |
| 2006/0039374 A1 | 2/2006 | Belz et al. |
| 2006/0045082 A1 | 3/2006 | Fertell et al. |
| 2006/0143300 A1 | 6/2006 | See et al. |
| 2007/0044141 A1 | 2/2007 | Lor et al. |
| 2007/0053296 A1 | 3/2007 | Yazaki et al. |
| 2007/0171918 A1 | 7/2007 | Ota et al. |
| 2007/0195761 A1 | 8/2007 | Tatar et al. |
| 2007/0233891 A1 | 10/2007 | Luby et al. |
| 2008/0002591 A1 | 1/2008 | Ueno |
| 2008/0028077 A1 | 1/2008 | Kamata et al. |
| 2008/0031141 A1 | 2/2008 | Lean et al. |
| 2008/0089336 A1 | 4/2008 | Mercier et al. |
| 2008/0137660 A1 | 6/2008 | Olakangil et al. |
| 2008/0159141 A1 | 7/2008 | Soukup et al. |
| 2008/0181119 A1 | 7/2008 | Beyers |
| 2008/0195731 A1 | 8/2008 | Harmel et al. |
| 2008/0225710 A1 | 9/2008 | Raja et al. |
| 2008/0304423 A1 | 12/2008 | Chuang et al. |
| 2009/0109933 A1* | 4/2009 | Murasawa ........... H04L 63/029 370/335 |
| 2009/0135835 A1 | 5/2009 | Gallatin et al. |
| 2009/0240644 A1 | 9/2009 | Boettcher et al. |
| 2009/0262745 A1 | 10/2009 | Leong et al. |
| 2010/0011126 A1 | 1/2010 | Hsu et al. |
| 2010/0135323 A1 | 6/2010 | Leong |
| 2010/0209047 A1 | 8/2010 | Cheung et al. |
| 2010/0228974 A1 | 9/2010 | Watts et al. |
| 2010/0293296 A1 | 11/2010 | Hsu et al. |
| 2010/0325178 A1 | 12/2010 | Won et al. |
| 2011/0044349 A1 | 2/2011 | Gallatin et al. |
| 2011/0058566 A1 | 3/2011 | Leong et al. |
| 2011/0211443 A1 | 9/2011 | Leong et al. |
| 2011/0216771 A1 | 9/2011 | Gallatin et al. |
| 2011/0283016 A1* | 11/2011 | Uchida ................. H04L 47/125 709/235 |
| 2012/0023340 A1 | 1/2012 | Cheung |
| 2012/0033556 A1* | 2/2012 | Kruglick ............... H04L 43/026 370/241 |
| 2012/0069737 A1* | 3/2012 | Vikberg ................ H04W 28/12 370/232 |
| 2012/0103518 A1 | 5/2012 | Kakimoto et al. |
| 2012/0157088 A1 | 6/2012 | Gerber et al. |
| 2012/0201137 A1 | 8/2012 | Le Faucheur et al. |
| 2012/0243533 A1 | 9/2012 | Leong |
| 2012/0257635 A1 | 10/2012 | Gallatin et al. |
| 2012/0275311 A1* | 11/2012 | Ivershen ................. H04L 41/12 370/241 |
| 2013/0010613 A1 | 1/2013 | Cafarelli et al. |
| 2013/0028072 A1 | 1/2013 | Addanki |
| 2013/0034107 A1 | 2/2013 | Leong et al. |
| 2013/0156029 A1 | 6/2013 | Gallatin et al. |
| 2013/0173784 A1 | 7/2013 | Wang et al. |
| 2013/0201984 A1 | 8/2013 | Wang |
| 2013/0259037 A1 | 10/2013 | Natarajan et al. |
| 2013/0272135 A1 | 10/2013 | Leong |
| 2013/0339540 A1* | 12/2013 | Sheer .................... H04L 65/608 709/231 |
| 2014/0003333 A1* | 1/2014 | Ivershen ................ H04W 24/08 370/328 |
| 2014/0016500 A1 | 1/2014 | Leong et al. |
| 2014/0022916 A1 | 1/2014 | Natarajan et al. |
| 2014/0029451 A1 | 1/2014 | Nguyen |
| 2014/0040478 A1 | 2/2014 | Hsu et al. |
| 2014/0101297 A1 | 4/2014 | Neisinger et al. |
| 2014/0161120 A1* | 6/2014 | Ikaheimo ............. H04L 43/028 370/352 |
| 2014/0204747 A1 | 7/2014 | Yu et al. |
| 2014/0219100 A1 | 8/2014 | Pandey et al. |
| 2014/0233399 A1 | 8/2014 | Mann et al. |
| 2014/0321278 A1 | 10/2014 | Cafarelli et al. |
| 2015/0009828 A1 | 1/2015 | Murakami |
| 2015/0009830 A1 | 1/2015 | Bisht et al. |
| 2015/0016306 A1* | 1/2015 | Masini ................. H04W 76/12 370/255 |
| 2015/0033169 A1 | 1/2015 | Lection et al. |
| 2015/0071171 A1 | 3/2015 | Akiyoshi |
| 2015/0103824 A1 | 4/2015 | Tanabe |

(56) References Cited

U.S. PATENT DOCUMENTS

| | | |
|---|---|---|
| 2015/0142935 A1 | 5/2015 | Srinivas et al. |
| 2015/0170920 A1 | 6/2015 | Purayath et al. |
| 2015/0180802 A1 | 6/2015 | Chen et al. |
| 2015/0195192 A1 | 7/2015 | Vasseur et al. |
| 2015/0207905 A1 | 7/2015 | Merchant et al. |
| 2015/0215841 A1 | 7/2015 | Hsu et al. |
| 2015/0256436 A1 | 9/2015 | Stoyanov et al. |
| 2015/0263889 A1 | 9/2015 | Newton |
| 2015/0281125 A1 | 10/2015 | Koponen et al. |
| 2015/0319070 A1* | 11/2015 | Nachum ............ H04L 12/4633 370/400 |
| 2015/0372840 A1* | 12/2015 | Benny ................ H04L 12/4675 370/409 |
| 2016/0119234 A1 | 4/2016 | Valencia Lopez et al. |
| 2016/0149811 A1 | 5/2016 | Roch et al. |
| 2016/0164768 A1 | 6/2016 | Natarajan et al. |
| 2016/0182329 A1 | 6/2016 | Armolavicius et al. |
| 2016/0182378 A1 | 6/2016 | Basavaraja et al. |
| 2016/0204996 A1 | 7/2016 | Lindgren et al. |
| 2016/0248655 A1 | 8/2016 | Francisco et al. |
| 2016/0255021 A1* | 9/2016 | Renfrew ............. H04W 24/02 370/328 |
| 2016/0285735 A1 | 9/2016 | Chen et al. |
| 2016/0285762 A1 | 9/2016 | Chen et al. |
| 2016/0285763 A1 | 9/2016 | Laxman et al. |
| 2016/0308766 A1 | 10/2016 | Register et al. |
| 2016/0373303 A1 | 12/2016 | Vedam et al. |
| 2016/0373304 A1 | 12/2016 | Sharma et al. |
| 2016/0373351 A1 | 12/2016 | Sharma et al. |
| 2016/0373352 A1* | 12/2016 | Sharma .................. H04L 45/74 |
| 2016/0380861 A1* | 12/2016 | Ali ........................ H04L 69/322 709/224 |
| 2017/0187649 A1 | 6/2017 | Chen et al. |
| 2017/0237632 A1 | 8/2017 | Hegde et al. |
| 2017/0237633 A1 | 8/2017 | Hegde et al. |
| 2017/0237838 A1* | 8/2017 | Vandevoorde ........ H04L 69/326 370/350 |

FOREIGN PATENT DOCUMENTS

| | | |
|---|---|---|
| EP | 3206344 A2 | 8/2017 |
| EP | 3206345 A2 | 8/2017 |
| IE | 20070438 A1 | 2/2008 |
| IN | 201641016960 | 5/2016 |
| IN | 201641035761 | 10/2016 |
| WO | 2010135474 A1 | 11/2010 |
| WO | 2015116538 A1 | 8/2015 |
| WO | 2015138513 A1 | 9/2015 |

OTHER PUBLICATIONS

U.S. Appl. No. 14/927,484, NonFinal Office Action dated Aug. 9, 2017, 77 pages.
U.S. Appl. No. 14/848,677, Notice of Allowance dated Aug. 28, 2017, 31 pages.
7433 GTP Session Controller, www.ixia.com, downloaded circa Apr. 2, 2015, pp. 1-3.
Stateful GTP Correlation, https://www.gigamon.com/PDF/appnote/AN-GTP-Correlation-Stateful-Subscriber-Aware-Filtering-4025.pdf, date 2013, pp. 1-9.
GigaVUE-2404 // Data Sheet, www.gigamon.com, date Feb. 2014, pp. 1-6.
NGenius Performance Manager, www.netscout.com, date Mar. 2014, pp. 1-8.
GigaVUE-VM // Data Sheet, www.gigamon.com, date Oct. 2014, pp. 1-3.
Unified Visibility Fabric an Innovative Approach, https://www.gigamon.com/unified-visibility-fabric, Downloaded circa Mar. 30, 2015, pp. 1-4.
adaptiv.io and Apsalar Form Strategic Partnership to Provide Omnichannel Mobile Data Intelligence, http://www.businesswire.com/news/home/20150113005721/en/adaptiv.io-Apsalar-Form-Strategic-Partnership-Provide-Omni-channel, Downloaded circa Mar. 30, 2015, pp. 1-2.
Real-time Data Analytics with IBM InfoSphere Streams and Brocade MLXe Series Devices, www.brocade.com, date 2011, pp. 1-2.
Syniverse Proactive Roaming Data Analysis—VisProactive, http://m.syniverse.com/files/service_solutions/pdf/solutionsheet_visproactive_314.pdf.,date 2014, pp. 1-3.
Network Analytics: Product Overview, www.sandvine.com, date Apr. 28, 2014, pp. 1-2.
Krishnan et al.: "Mechanisms for Optimizing LAG/ECMP Component Link Utilization in Networks", Oct. 7, 2014, 27 pages, https://tools.ietf.org/html/draft-ietf-opsawg-large-flow-load-balancing-15.
Indian Provisional Patent Application entitled: "System and Method for Offline Load Balancing of SCTP Protocol Traffic"; Appln. No. 201641010295 filed Mar. 24, 2016; 13 pages.
U.S. Appl. No. 15/466,732, filed Mar. 22, 2017 by Hegde et al.
U.S. Appl. No. 15/467,766, filed Mar. 23, 2017 by Nagaraj et al.
U.S. Appl. No. 15/425,777, filed Feb. 6, 2017, by Chen et al.
52—Joshi et al.: A Review of Network Traffic Analysis and Prediction Techniques; arxiv.org; 2015; 22 pages.
53—Anjali et al.: MABE: A New Method for Available Bandwidth Estimation in an MPLS Network; submitted to World Scientific on Jun. 5, 2002; 12 pages.
54—Cisco Nexus Data Broker: Scalable and Cost-Effective Solution for Network Traffic Visibility; Cisco 2015; 10 pages.
55—VB220-240G Modular 10G/1G Network Packet Broker; VSS Monitoring; 2016, 3 pages.
56—Big Tap Monitoring Fabric 4.5; Big Switch Networks; Apr. 2015; 8 pages.
57—Gigamon Intelligent Flow Mapping—Whitepaper; 3039-04; Apr. 2015; 5 pages.
58—Ixia White Paper; The Real Secret to Securing Your Network; Oct. 2014; 16 pages.
59—Accedian—Solution Brief; FlowBROKER; Feb. 2016; 9 pages.
60—Network Time Machine for Service Providers; NETSCOUT; http://enterprise.netscout.com/telecom-tools/lte-solutions/network-time-machine-service-providers; Apr. 18, 2017; 8 pages.
61—Arista EOS Central—Introduction to TAP aggregation; https://eos.arista.com/introduction-to-tap-aggregation/; Apr. 18, 2017; 6 pages.
62—Brocade Session Director—Data Sheet; 2016; https://www.brocade.com/content/dam/common/documents/content-types/datasheet/brocade-session-director-ds.pdf; 5 pages.
63—Ixia—Evaluating Inline Security Fabric: Key Considerations; White Paper; https://www.ixiacom.com/sites/default/files/2016-08/915-8079-01-S-WP-Evaluating%20Inline%20Security%20Fabric_v5.pdf; 10 pages.
64—Next-Generation Monitoring Fabrics for Mobile Networks; Big Switch Networks—White Paper; 2014; 9 pages.
65—Gigamon Adaptive Packet Filtering; Jan. 25, 2017; 3 pages.
66—VB220 Modular 10G.1G Network Packet Broker Datasheet; VSS Monitoring; 2016; 8 pages.
67—FlexaWare; FlexaMiner Packet Filter FM800PF; Jan. 27, 2017; 5 pages.
68—GL Communications Inc.; PacketBroker—Passive Ethernet Tap; Jan. 27, 2017; 2 pages.
69—International Search Report & Written Opinion for PCT Application PCT/US2017/025998 dated Jul. 20, 2017, 8 pages.
70—Ixia & VECTRA, Complete Visibility for a Stronger Advanced Persistent Threat (APT) Defense, pp. 1-2, May 30, 2016.
71—Extended European Search Report & Opinion for EP Application 17000212.5 dated Aug. 1, 2017, 9 pages.
72—Extended European Search Report & Opinion for EP Application 17000213.3 dated Aug. 1, 2017, 7 pages.
U.S. Appl. No. 61/919,244, filed Dec. 20, 2013 by Chen et al.
U.S. Appl. No. 61/932,650, filed Jan. 28, 2014 by Munshi et al.
U.S. Appl. No. 61/994,693, filed May 16, 2014 by Munshi et al.
U.S. Appl. No. 62/088,434, filed Dec. 5, 2014 by Hsu et al.
U.S. Appl. No. 62/137,073, filed Mar. 23, 2015 by Chen et al.
U.S. Appl. No. 62/137,084, filed Mar. 23, 2015 by Chen et al.
U.S. Appl. No. 62/137,096, filed Mar. 23, 2015 by Laxman et al.
U.S. Appl. No. 62/137,106, filed Mar. 23, 2015 by Laxman et al.

(56) References Cited

OTHER PUBLICATIONS

U.S. Appl. No. 60/998,410, filed Oct. 9, 2007 by Wang et al.
U.S. Appl. No. 60/169,502, filed Dec. 7, 2009 by Yeejang James Lin.
U.S. Appl. No. 60/182,812, filed Feb. 16, 2000 by Skene et al.
PCT Patent Application No. PCT/US2015/012915 filed on Jan. 26, 2015 by Hsu et al.
U.S. Appl. No. 14/320,138, filed Jun. 30, 2014 by Chen et al.
U.S. Appl. No. 14/603,304, filed Jan. 22, 2015 by Hsu et al.
U.S. Appl. No. 14/848,586, filed Sep. 9, 2015 by Chen et al.
U.S. Appl. No. 14/848,645, filed Sep. 9, 2015 by Chen et al.
U.S. Appl. No. 14/848,677, filed Sep. 9, 2015 by Laxman et al.
U.S. Appl. No. 09/459,815, filed Dec. 13, 1999 by Skene et al.
U.S. Appl. No. 14/927,478, filed Oct. 30, 2015 by Vedam et al.
U.S. Appl. No. 14/927,479, filed Oct. 30, 2015 by Sharma et al.
U.S. Appl. No. 14/927,482, filed Oct. 30, 2015 by Sharma et al.
U.S. Appl. No. 14/927,484, filed Oct. 30, 2015 by Sharma et al.
U.S. Appl. No. 15/205,889, filed Jul. 8, 2016 by Hegde et al.
U.S. Appl. No. 15/206,008, filed Jul. 8, 2016 by Hegde et al.
Non-Final Office Action for U.S. Appl. No. 11/827,524 dated Dec. 10, 2009, 15 pages.
Non-Final Office Action for U.S. Appl. No. 11/827,524 dated Jun. 2, 2010, 14 pages.
Non-Final Office Action for U.S. Appl. No. 11/827,524 dated Nov. 26, 2010, 16 pages.
Final Office Action for U.S. Appl. No. 11/827,524 dated May 6, 2011, 19 pages.
Advisory Action for U.S. Appl. No. 11/827,524 dated Jul. 14, 2011, 5 pages.
Non-Final Office Action for U.S. Appl. No. 11/827,524 dated Oct. 18, 2012, 24 pages.
Notice of Allowance for U.S. Appl. No. 11/827,524 dated Jun. 25, 2013, 11 pages.
Non-Final Office Action for U.S. Appl. No. 14/030,782 dated Oct. 6, 2014, 14 pages.
Non-Final Office Action for U.S. Appl. No. 13/584,534 dated Oct. 24, 2014, 24 pages.
Restriction Requirement for U.S. Appl. No. 13/584,534 dated Jul. 21, 2014, 5 pages.
Non-Final Office Action for U.S. Appl. No. 11/937,285 dated Jul. 6, 2009, 28 pages.
Final Office Action for U.S. Appl. No. 11/937,285 dated Mar. 3, 2010, 28 pages.
Non-Final Office Action for U.S. Appl. No. 11/937,285 dated Aug. 17, 2010, 28 pages.
Final Office Action for U.S. Appl. No. 11/937,285 dated Jan. 20, 2011, 41 pages.
Final Office Action for U.S. Appl. No. 11/937,285 dated May 20, 2011, 37 pages.
Non-Final Office Action for U.S. Appl. No. 11/937,285 dated Nov. 28, 2011, 40 pages.
Notice of Allowance for U.S. Appl. No. 11/937,285 dated Jun. 5, 2012, 10 pages.
Final Office Action for U.S. Appl. No. 14/030,782 dated Jul. 29, 2015, 14 pages.
Final Office Action for U.S. Appl. No. 13/584,534 dated Jun. 25, 2015, 21 pages.
Notice of Allowance for U.S. Appl. No. 14/030,782 dated Nov. 16, 2015, 20 pages.
Notice of Allowance for U.S. Appl. No. 13/584,534 dated Dec. 16, 2015, 7 pages.
Notice of Allowance for U.S. Appl. No. 13/584,534 dated Jan. 6, 2016, 4 pages.
Non-Final Office Action for U.S. Appl. No. 14/320,138 dated Feb. 2, 2016, 30 pages.
Non-Final Office Action for U.S. Appl. No. 15/043,421 dated Apr. 13, 2016, 18 pages.
U.S. Appl. No. 12/272,618, Final Office Action dated May 5, 2014, 13 pages.
U.S. Appl. No. 12/272,618, NonFinal Office Action dated Jul. 29, 2013, 13 pages.
U.S. Appl. No. 12/272,618, NonFinal Office Action dated Jan. 12, 2015, 5 pages.
U.S. Appl. No. 12/272,618, Notice of Allowance dated Aug. 26, 2015, 11 pages.
U.S. Appl. No. 12/272,618, Final Office Action dated Feb. 28, 2012, 12 pages.
U.S. Appl. No. 13/925,670, NonFinal Office Action dated Nov. 16, 2015, 48 pages.
U.S. Appl. No. 14/230,590, Notice of Allowance dated Sep. 23, 2015, 8 pages.
U.S. Appl. No. 15/043,421, Notice of Allowance dated Jun. 27, 2016, 21 pages.
U.S. Appl. No. 14/603,304, NonFinal Office Action dated Aug. 1, 2016, 86 pages.
U.S. Appl. No. 14/320,138, Notice of Allowance dated Sep. 23, 2016, 17 pages.
U.S. Appl. No. 14/603,304, Notice of Allowance dated Jan. 11, 2017, 13 pages.
U.S. Appl. No. 14/848,677, NonFinal Office Action dated Feb. 10, 2017, 83 pages.
IBM User Guide, Version 2.1AIX, Solaris and Windows NT, Third Edition (Mar. 1999) 102 Pages.
White Paper, Foundry Networks, "Server Load Balancing in Today's Web-Enabled Enterprises" Apr. 2002 10 Pages.
International Search Report & Written Opinion for PCT Application PCT/US2015/012915 dated Apr. 10, 2015, 15 pages.
Gigamon: Vistapointe Technology Solution Brief; Visualize-Optimize-Monetize-3100-02; Feb. 2014; 2 pages.
Gigamon: Netflow Generation Feature Brief; 3099-04; Oct. 2014; 2 pages.
Gigamon: Unified Visibility Fabric Solution Brief; 3018-03; Jan. 2015; 4 pages.
Gigamon: Active Visibility for Multi-Tiered Security Solutions Overview; 3127-02; Oct. 2014; 5 pages.
Gigamon: Enabling Network Monitoring at 40Gbps and 100Gbps with Flow Mapping Technology White Paper; 2012; 4 pages.
Gigamon: Enterprise System Reference Architecture for the Visibility Fabric White Paper; 5005-03; Oct. 2014; 13 pages.
Gigamon: Gigamon Intelligent Flow Mapping White Paper; 3039-02; Aug. 2013; 7 pages.
Gigamon: Maintaining 3G and 4G LTE Quality of Service White Paper; 2012; 4 pages.
Gigamon: Monitoring, Managing, and Securing SDN Deployments White Paper; 3106-01; May 2014; 7 pages.
Gigamon: Service Provider System Reference Architecture for the Visibility Fabric White Paper; 5004-01; Mar. 2014; 11 pages.
Gigamon: Unified Visibility Fabric—A New Approach to Visibility White Paper; 3072-04; Jan. 2015; 6 pages.
Gigamon: The Visibility Fabric Architecture—A New Approach to Traffic Visibility White Paper; 2012-2013; 8 pages.
Ixia: Creating a Visibility Architecture—a New Perspective on Network Visibilty White Paper; 915-6581-01 Rev. A, Feb. 2014; 14 pages.
Gigamon: Unified Visibility Fabric; https://www.gigamon.com/unfied-visibility-fabric; Apr. 7, 2015; 5 pages.
Gigamon: Application Note Stateful GTP Correlation; 4025-02; Dec. 2013; 9 pages.
Brocade and IBM Real-Time Network Analysis Solution; 2011 Brocade Communications Systems, Inc.; 2 pages.
Ixia Anue GTP Session Controller; Solution Brief; 915-6606-01 Rev. A, Sep. 2013; 2 pages.
Netscout; Comprehensive Core-to-Access IP Session Analysis for GPRS and UMTS Networks; Technical Brief; Jul. 16, 2010; 6 pages.
Netscout: nGenius Subscriber Intelligence; Data Sheet; SPDS_001-12; 2012; 6 pages.
Gigamon: Visibility Fabric Architecture Solution Brief; 2012-2013; 2 pages.
Gigamon: Visibility Fabric; More than Tap and Aggregation.bmp; 2014; 1 page.

(56) References Cited

OTHER PUBLICATIONS

Ntop: Monitoring Mobile Networks (2G, 3G and LTE) using nProbe; http://www.ntop.org/nprobe/monitoring-mobile-networks-2g-3g-and-lte-using-nprobe; Apr. 2, 2015; 4 pages.
Gigamon: GigaVUE-HB1 Data Sheet; 4011-07; Oct. 2014; 4 pages.
Brocade IP Network Leadership Technology; Enabling Non-Stop Networking for Stackable Switches with Hitless Failover; 2010; 3 pages.
Gigamon: Adaptive Packet Filtering; Feature Brief; 3098-03 Apr. 2015; 3 pages.
Delgadillo, "Cisco Distributed Director", White Paper, 1999, at URL:http://www-europe.cisco.warp/public/751/distdir/dd_wp.htm, (19 pages) with Table of Contents for TeleCon (16 pages).
Cisco LocalDirector Version 1.6.3 Release Notes, Oct. 1997, Cisco Systems, Inc. Doc No. 78-3880-05.
"Foundry Networks Announces Application Aware Layer 7 Switching on ServerIron Platform," (Mar. 1999).
Foundry ServerIron Installation and Configuration Guide (May 2000), Table of Contents—Chapter 1-5, http://web.archive.org/web/20000815085849/http://www.foundrynetworks.com/techdocs/SI/index.html.
Foundry ServerIron Installation and Configuration Guide (May 2000), Chapter 6-10, http://web.archive.org/web/20000815085849/http://www.foundrynetworks.com/techdocs/SI/index.html.
Foundry ServerIron Installation and Configuration Guide (May 2000), Chapter 11—Appendix C, http://web.archive.org/web/20000815085849/http://www.foundrynetworks.com/techdocs/SI/index.html.
NGenius Subscriber Intelligence, http://www.netscout.com/uploads/2015/03NetScout_DS_Subscriber_Intelligence_SP.pdf, downloaded circa Mar. 23, 2015, pp. 1-6.
Xu et al.: Cellular Data Network Infrastructure Characterization and Implication on Mobile Content Placement, Sigmetrics '11 Proceedings of the ACM SIGMETRICS joint international conference on Measurement and modeling of computer systems, date Jun. 7-11, 2011, pp. 1-12, ISBN: 978-1-4503-0814-4 ACM New York, NY, USA copyright 2011.
E.H.T.B. Brands, Flow-Based Monitoring of GTP Trac in Cellular Networks, Date: Jul. 20, 2012, pp. 1-64, University of Twente, Enschede, The Netherlands.
Qosmos DeepFlow: Subscriber Analytics Use Case, http://www.qosmos.com/wp-content/uploads/2014/01/Qosmos-DeepFlow-Analytics-use-case-datasheet-Jan-2014.pdf, date Jan. 2014, pp. 1-2.
Configuring GTM to determine packet gateway health and availability, https://support.f5.com/kb/en-us/products/big-ip_gtm/manuals/product/gtm-implementations-11-6-0/9.html, downloaded circa Mar. 23, 2015, pp. 1-5.
ExtraHop—Arista Persistent Monitoring Architecture for SDN, downloaded circa Apr. 2, 2015, pp. 1-5.

\* cited by examiner

OFFLINE, INTELLIGENT LOAD BALANCING OF SCTP TRAFFIC

CROSS-REFERENCES TO RELATED APPLICATIONS

The present application claims the benefit and priority of India Provisional Application No. 201641010295, filed Mar. 24, 2016, entitled "SYSTEM AND METHOD FOR OFFLINE LOAD BALANCING OF SCTP PROTOCOL TRAFFIC." The entire contents of this application are incorporated herein by reference in its entirety for all purposes.

BACKGROUND

As known in the field of computer networking, a visibility network (sometimes referred to as a visibility fabric) is a type of network that facilitates the monitoring and analysis of traffic flowing through another network (referred to herein as a "core" network). The purposes of deploying a visibility network are varied and can include management/optimization of the core network, security monitoring of the core network, business intelligence/reporting, compliance validation, and so on.

FIG. 1 depicts an example visibility network 100 according to an embodiment. As shown, visibility network 100 includes a number of taps 102 that are deployed within a core network 104. Taps 102 are configured to replicate traffic that is exchanged between network elements in core network 104 and forward the replicated traffic to a packet broker 106 (note that, in addition to or in lieu of taps 102, one or more routers or switches in core network 104 can be tasked to replicate and forward traffic to packet broker 106 using their respective SPAN or mirror functions). Packet broker 106 can perform various packet processing functions on the traffic received from taps 102, such as removing protocol headers, filtering/classifying/correlating packets based on configured rules, and so on. Packet broker 106 can then transmit the processed traffic to one or more analytic probes/tools 108, which can carry out various types of calculations and analyses on the traffic in accordance with the business goals/purposes of visibility network 100 (e.g., calculation of key performance indicators (KPIs), detection of security threats/attacks in core network 104, generation of reports, etc.).

In cases where a single probe/tool 108 does not have sufficient capacity (e.g., compute capacity, memory capacity, storage capacity, etc.) to analyze the entirety of the traffic volume replicated from core network 104, packet broker 106 can implement functionality to distribute the replicated traffic across a number of probes/tools in a load balanced manner. In this way, each individual probe/tool 108 can be tasked to handle a subset (rather than the entirety) of the replicated traffic. Existing packet brokers typically implement this load balancing functionality by calculating a hash value for each replicated packet based on a 5-tuple of packet header fields comprising <source IP address, source port, destination IP address, destination port, protocol identifier> and then forwarding the packet to the probe/tool associated with the calculated hash value.

Unfortunately, while load balancing based on the foregoing 5-tuple works well for transport protocols such as TCP or UDP where traffic is always transmitted along a single path between endpoints (i.e., between a single source IP and single destination IP), it is less suitable for transport protocols such as SCTP (Stream Control Transmission Protocol) where traffic can be transmitted along one of multiple paths between endpoints (known as multi-homing). This is because multi-homing protocols support automatic failover of traffic from one path to another in response to a failure, which in the case of 5-tuple based load balancing will cause the packets for a given communication session to be hashed, and thus forwarded, to a different probe/tool after the failover than before the failover. This switch in the destination probe/tool is undesirable since all of the traffic for a single communication session (e.g., in the case of mobile network, a single mobile user session) should ideally go to the same probe/tool in order to facilitate state-based analyses.

Further, even in non-multi-homing deployments, hashing based on the 5-tuple of <source IP address, source port, destination IP address, destination port, protocol identifier> necessarily causes a given probe/tool to receive all of the traffic between the two endpoints identified in the tuple. If the volume of traffic between those two endpoints is particularly large, the probe/tool may become overloaded. Accordingly, it would be desirable to have a mechanism for performing load balancing within a visibility network that is more intelligent than simple 5-tuple hashing.

SUMMARY

Techniques for enabling offline, intelligent load balancing of Stream Control Transmission Protocol (SCTP) traffic are provided. According to one embodiment, a load balancer can receive one or more SCTP packets that have been replicated from a network being monitored. The load balancer can further recover an SCTP message from the one or more SCTP packets and can map the SCTP message to an egress port based on one or more parameters decoded from the SCTP message and one or more rules. The load balancer can then transmit the SCTP message out of the egress port towards an analytic probe or tool for analysis.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for performing offline, intelligent load balancing of traffic that is transmitted via a multi-homing transport protocol such as SCTP. The qualifier "offline" means that these load balancing techniques can be performed on replicated (rather than live) traffic, such as via a packet broker in a visibility network. The qualifier "intelligent" means that these techniques can perform load balancing in a more configurable and granular fashion than 5-tuple hashing (for example, at the granularity of SCTP messages), and thus can overcome the problems that arise when using 5-tuple based load balancing in, e.g., multi-homing deployments.

These and other aspects of the present disclosure are described in further detail in the sections that follow.

2. Visibility Network

Figure 1:
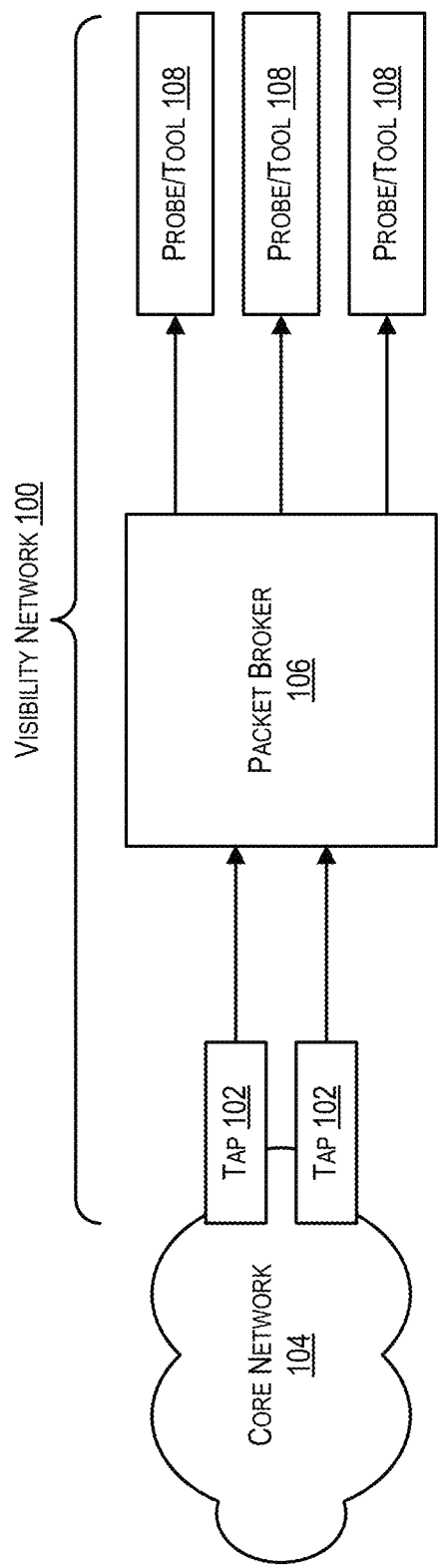
FIG. 1 depicts an example visibility network.
Figure 2:
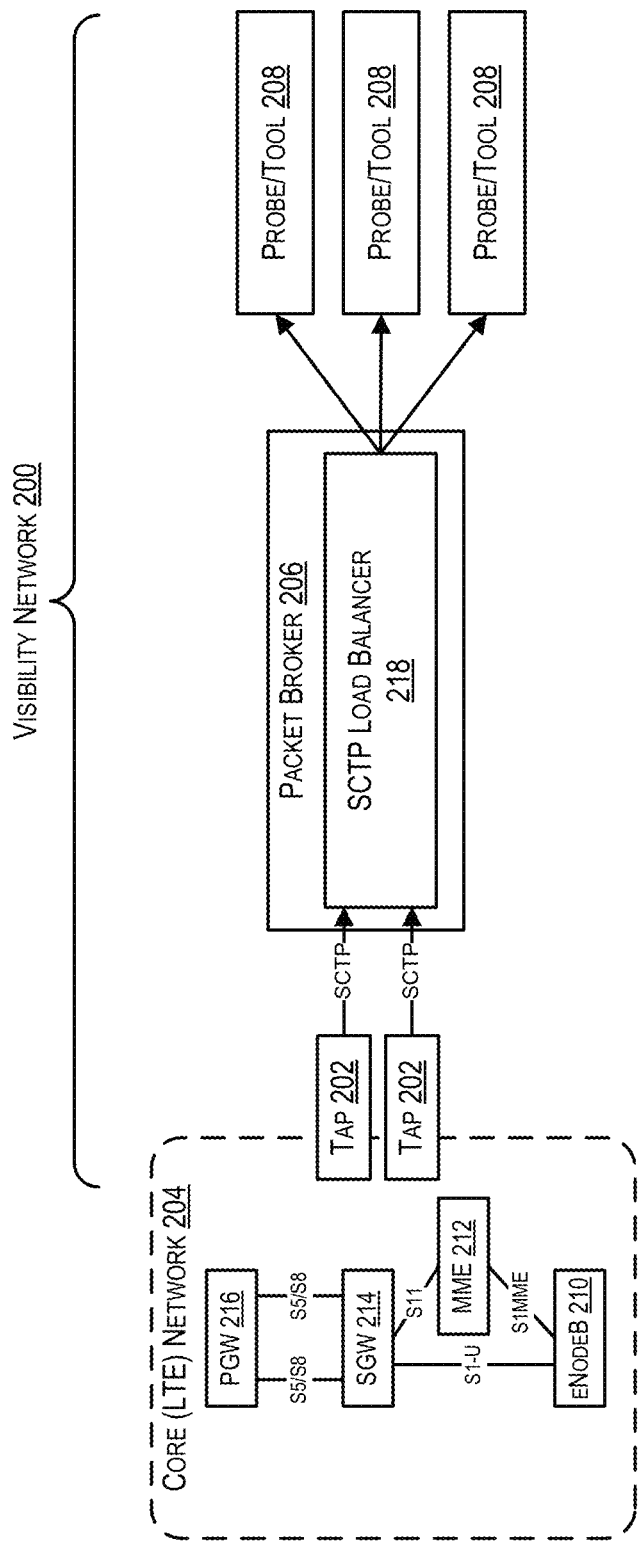
FIG. 2 depicts a visibility network comprising an SCTP load balancer according to an embodiment.

FIG. 2 depicts an example visibility network 200 that may be used to implement the intelligent load balancing techniques of the present disclosure according to an embodiment. As shown, visibility network 200 includes a number of taps 202 that are deployed in a core network 204 and are configured to replicate traffic exchanged in network 204 to a packet broker 206. In FIG. 2, core network 204 is a mobile LTE network that comprises network elements specific to this type of network, such as an eNodeB 210, a mobility management entity (MME) 212, a serving gateway (SGW) 214, and a packet data network gateway (PGW) 216 which connects to an external packet data network such as the Internet. Further, in this particular example, taps 202 are configured to replicate and forward SCTP traffic that is exchanged on certain interfaces (e.g., S1MME, SGs, S6a, Gx, and Gy) of core network 204. However, it should be appreciated that core network 204 can be any other type of computer network known in the art, such as a mobile 3G network, a landline local area network (LAN) or wide area network (WAN), etc.

Upon receiving the replicated traffic via taps 202, packet broker 206 can perform various types of packet processing functions on the traffic (as configured/assigned by an operator of visibility network 200) and can forward the processed traffic to one or more analytic probes/tools 208 for analysis. In one embodiment, packet broker 206 can be implemented solely in hardware, such as in the form of a network switch or router that relies on ASIC or FPGA-based packet processors to execute its assigned packet processing functions based on rules that are programmed into hardware memory tables (e.g., CAM tables) resident on the packet processors and/or line cards of the device. In another embodiment, packet broker 206 can be implemented solely in software that runs on, e.g., one or more general purpose physical or virtual computer systems. In yet another embodiment, packet broker 206 can be implemented using a combination of hardware and software, such as a combination of a hardware-based basic packet broker and a software-based "session director" cluster as described in co-owned U.S. patent application Ser. No. 15/205,889, entitled "Software-based Packet Broker," the entire contents of which are incorporated herein by reference in its entirety for all purposes.

As noted in the Background section, in cases where the replicated traffic from core network 204 needs to be load balanced across multiple probes/tools 208, conventional packet brokers typically calculate a hash value for each replicated packet based on a 5-tuple of packet header fields comprising <source IP address, source port, destination IP address, destination port, protocol identifier> and forward the packet to a probe/tool mapped to the calculated hash value. However, this approach is problematic for traffic that is transported over a multi-homing transport protocol such as SCTP, since the packets for a given communication session may be inadvertently re-routed to a different probe/tool after a network failure (due to the session traffic being failed over to an alternate path between the session endpoints). Further, since 5-tuple based load balancing sends all of the traffic between two endpoint IP addresses to the same designated probe/tool, if the volume of traffic between those IP addresses becomes abnormally high, the designated probe/tool can become overloaded.

To address these and other similar issues, packet broker 206 of FIG. 2 implements a novel SCTP load balancer 218. Depending on the configuration of packet broker 206, SCTP load balancer 218 can be implemented in software, hardware, or a combination thereof. Generally speaking, SCTP load balancer 218 can receive the SCTP traffic that is replicated from core network 204 (after it has been processed via the assigned functions of packet broker 206) and can distribute that traffic across probes/tools 208 in a manner that (1) is more granular/configurable that 5-tuple hashing, and (2) ensures all of the traffic for a single communication session is sent to the same probe/tool, even if SCTP causes an automatic failover from one multi-homing path to another. In these ways, SCTP load balancer 218 can eliminate or minimize the problems associated with simple 5-tuple based load balancing.

For example, in one set of embodiments, SCTP load balancer 218 can recover SCTP messages that are embedded in the SCTP packets replicated from core network 204 and can map the individual messages to particular egress ports (and thus, probes/tools) in a load balanced manner based on user-defined rules/criteria. SCTP load balancer 218 can then transmit the SCTP messages out of the mapped egress ports in the form of newly constructed SCTP packets. This approach is referred to herein as the "packet modifying" approach and is detailed in section (4) below.

In an alternative set of embodiments, SCTP load balancer 218 can recover SCTP messages that are embedded in the replicated SCTP packets and can map the messages to particular egress ports in a load balanced manner based on user-defined rules/criteria as noted above; however, instead of transmitting the SCTP messages in the form of newly constructed SCTP packets, SCTP load balancer 218 can transmit the messages by forwarding intact copies of the original SCTP packets (i.e., the packets received at packet broker 206 via, e.g., taps 202). In a situation where an original SCTP packet includes two messages (or portions thereof) that are mapped to two different egress ports respectively, SCTP load balancer 218 can forward a copy of that packet out of each of the two egress ports. This approach is referred to herein as the "packet preserving" approach and is detailed in section (5) below.

It should be appreciated that FIG. 2 is illustrative and not intended to limit embodiments of the present disclosure. For example, the various entities shown in FIG. 2 may be arranged according to different configurations and/or include subcomponents or functions that are not specifically described. One of ordinary skill in the art will recognize other variations, modifications, and alternatives.

3. Stream Control Transmission Protocol (SCTP)

To provide further context for the load balancing techniques described herein, the following sub-sections present a brief discussion of SCTP and its properties.

3.1 Protocol overview and multi-homing

SCTP is a transport layer (i.e., OSI Layer 4) protocol that is commonly used in mobile networks such as LTE network 204 shown in FIG. 2 for signaling messages between the network's various elements (e.g., eNodeB, MME, MSC, etc.). As mentioned previously, SCTP supports multi-homing, which allows multiple, redundant paths to be defined between the endpoints of an SCTP connection (known as an SCTP "association"). In this way, SCTP can provide a level of resiliency and reliability that is not possible using alternative transport protocols such TCP or UDP.

Figure 3:
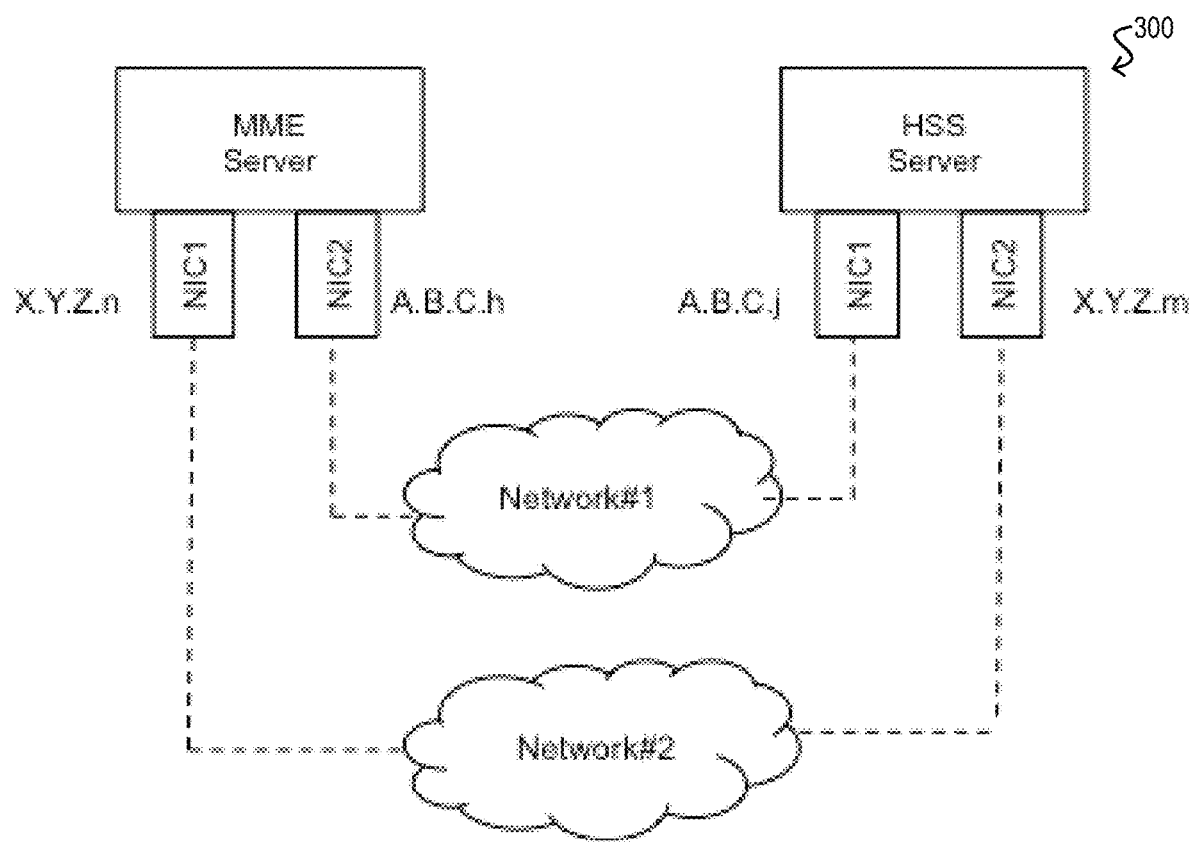
FIG. 3 depicts a diagram of two network elements that are connected via SCTP using multi-homing according to an embodiment.

For example, FIG. 3 depicts an MME server and a HSS server that are connected via an SCTP association comprising two paths (a first through network #1 and a second through network #2). The first path is defined between a NIC2 on the MME server having an IP address A.B.C.h and a NIC1 on the HSS server having an IP address A.B.C.j. Further, the second path is defined between a NIC1 on the MME server having an IP addresses X.Y.Z.n and a NIC2 on the HSS server having an IP address X.Y.Z.m. In a situation where a failure (e.g., port or link failure) occurs on either path, the protocol can detect the failure can automatically redirect traffic to the other path, thereby ensuring that traffic continues to flow between the servers.

3.2 Message-Oriented Multi-Streaming

SCTP is a message-oriented protocol, which means that it transmits a sequence of messages (rather than an unbroken sequence of bytes) between endpoints. Each message is composed of a sequence of smaller units known as chunks.

SCTP is also a multi-streaming protocol, which means that it can transmit, within a single SCTP association, several independent streams of messages/chunks in parallel. Error handling is implemented on a per-stream basis and thus a packet drop, CRC error, or checksum error on one stream will not affect the transfer of other streams, which eliminates unnecessary head-of-line blocking. In LTE networks, SCTP streams are commonly used to group together messages belonging to a range of mobile users (identified by, e.g., International Mobile Subscriber Identity (IMSI)), such as one stream for every X users.

Figure 4:
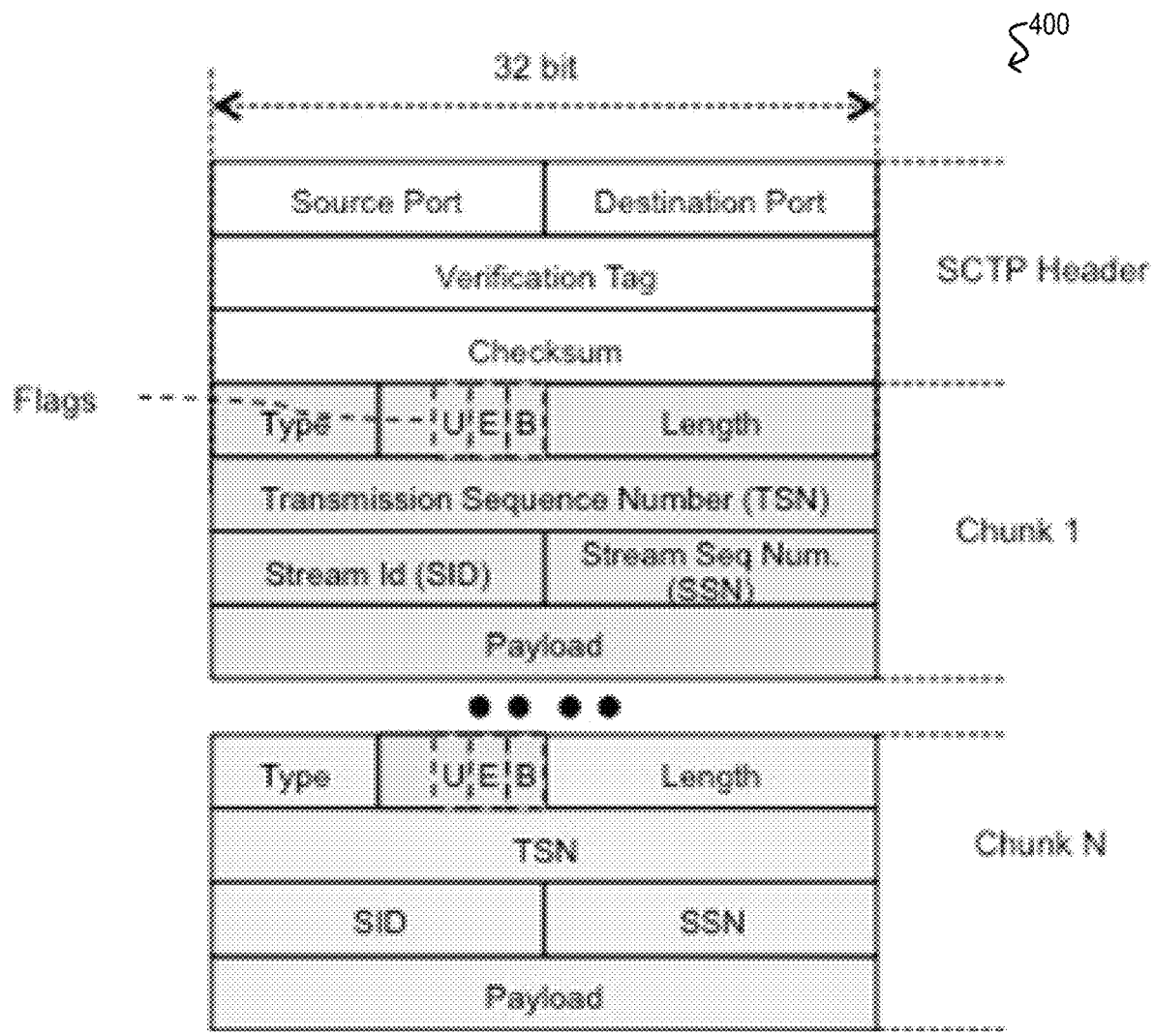
FIG. 4 depicts the structure of an SCTP packet according to an embodiment.

To clarify the message-oriented multi-streaming nature of SCTP, FIG. 4 depicts the structure of a typical SCTP packet 400. As shown, SCTP packet 400 includes a SCTP header and a number of chunks 1-N. Each chunk includes a stream ID which uniquely identifies the stream to which the chunk belongs, a transmission sequence number (TSN) which uniquely identifies the ordering of the chunk relative to other chunks in the same and other SCTP packets transmitted via this association, and a stream sequence number (SSN) which identifies the message within the stream to which the chunk belongs. With this information, a receiver endpoint of an SCTP association can reconstruct the streams and constituent messages sent by the sender endpoint of the association.

It should be noted that SCTP supports two types of chunks—data chunks and control chunks. Data chunks carry a message payload while control chunks are used for creating/tearing down an SCTP association, transmitting acknowledgements between endpoints, and testing reachability. To preserve message boundaries, each chunk includes a "B" (begin) bit and an "E" (end) bit; these bits indicate whether the chunk is the first chunk of a message or the last chunk of a message respectively. If both bits are set, the chunk contains the entirety of a single message.

It should also be noted that a SCTP packet may contain chunks (and thus messages) belonging to different streams. There is no requirement that a given SCTP packet comprise data solely for a single stream.

4. Packet Modifying SCTP Load Balancing

Figure 5:
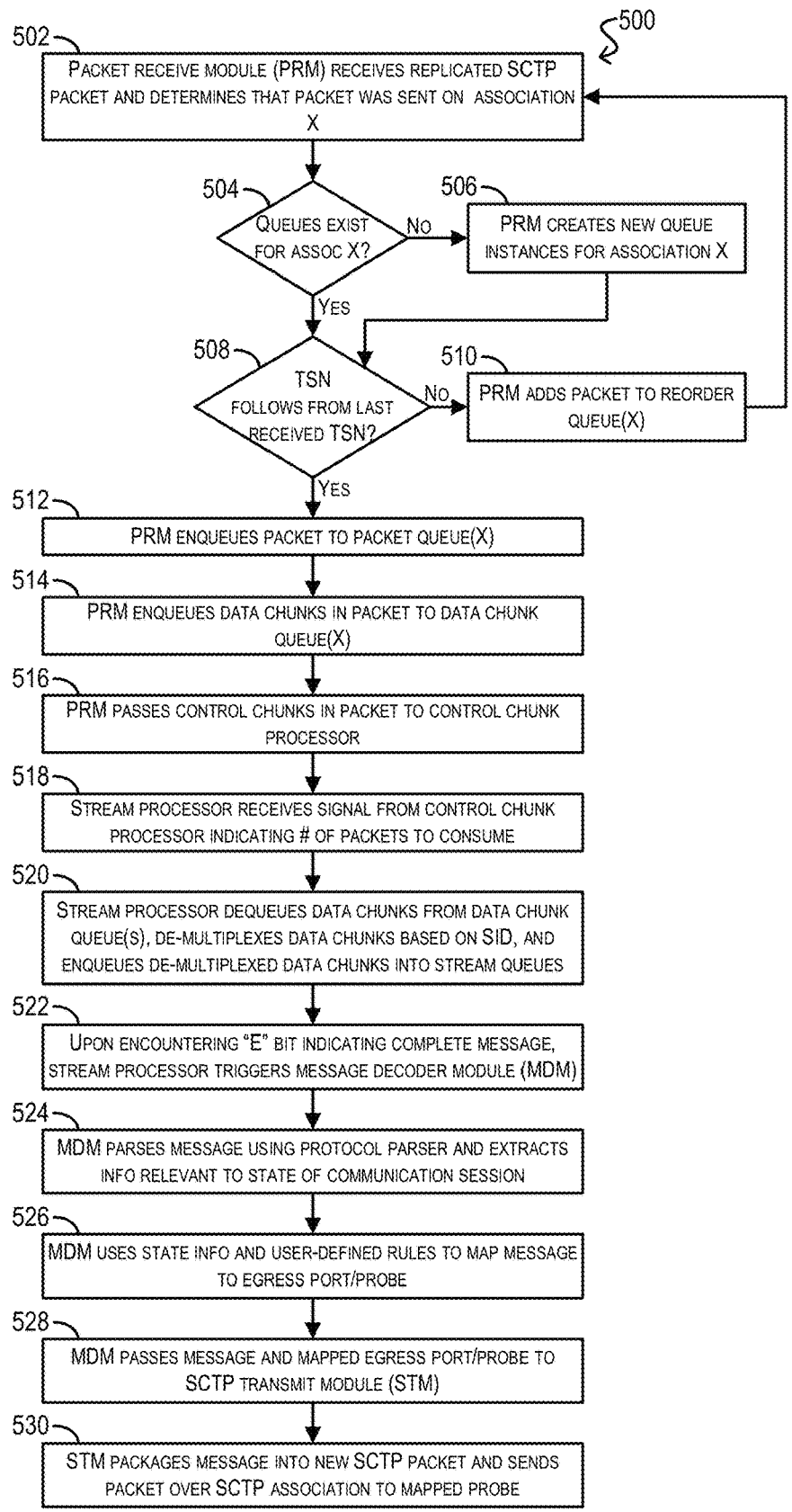
FIGS. 5 and 6 depict a flowchart and a packet flow for performing packet modifying SCTP load balancing according to an embodiment.
Figure 6:
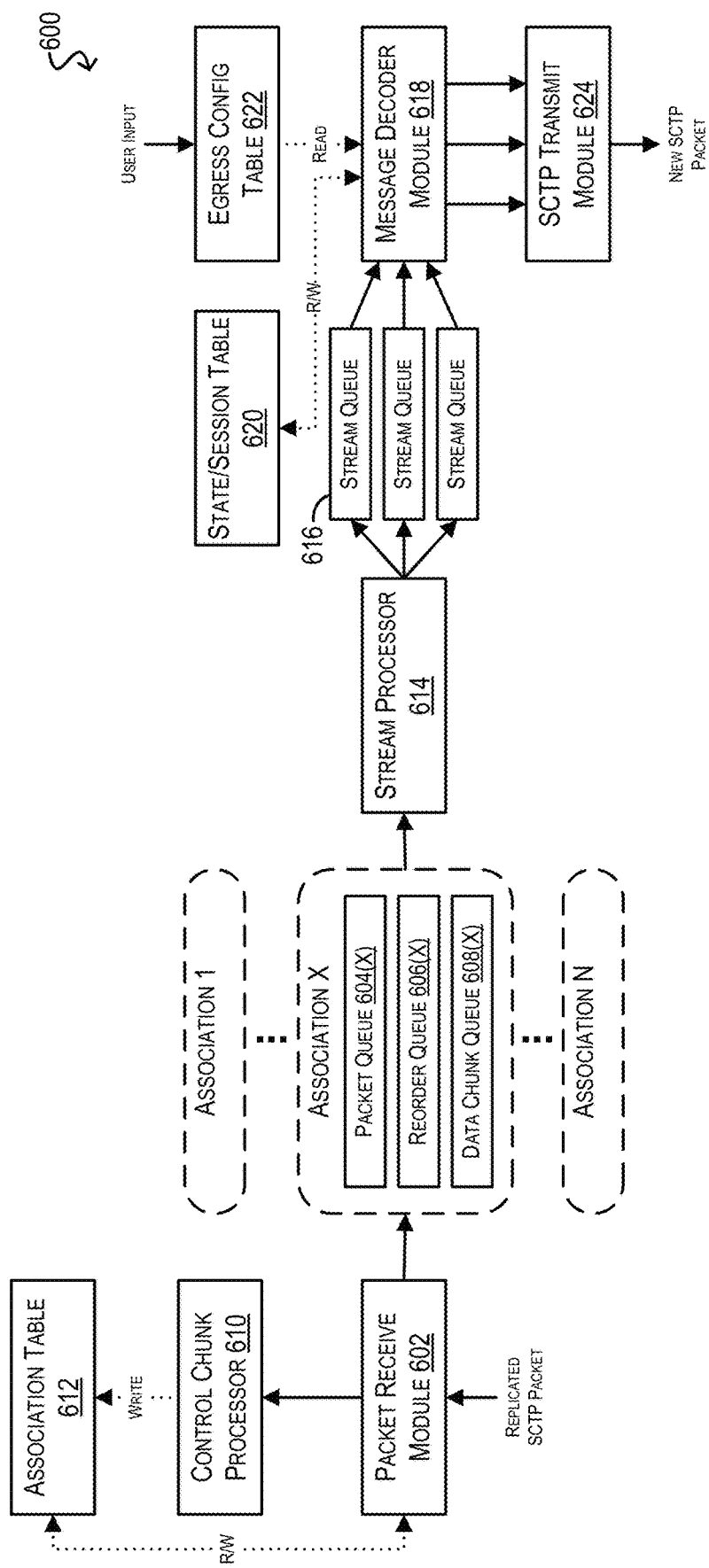

With the foregoing discussion of SCTP in mind, FIGS. 5 and 6 depict a flowchart 500 and a packet flow 600 respectively that may be carried out by SCTP load balancer 218 of FIG. 2 for performing offline, intelligent SCTP load balancing in a "packet modifying" manner according to an embodiment. These figures are described in combination below. With this packet modifying approach, SCTP load balancer 218 can recover the messages contained in the SCTP packets replicated from core network 204 and effectively repackage these messages into new SCTP packets that are sent to probes/tools 208. In this way, SCTP load balancer 218 can load balance the replicated SCTP traffic on a per-message basis towards probes/tools 208.

Starting with block 502 of flowchart 500, a packet receive module 602 of SCTP load balancer 218 (shown in packet flow 600) can receive an SCTP packet that has been replicated from core network 204 and can determine the SCTP association on which the packet was sent.

Packet receive module 602 can make this determination based on, e.g., the SCTP header in the packet.

Assuming that the determined SCTP association is X, packet receive module 602 can check whether a packet queue 604(X), a packet reorder queue 606(X), and a data chunk queue 608(X) exists for association X within SCTP load balancer 218 (block 504). If not, packet receive module 602 can cause a new instance of each of these queues to be created for association X (block 506).

Upon creating queues 604(X)-608(X) (or verifying that they already exist), packet receive module 602 can further check whether the TSN of the first chunk in the SCTP packet has continuity with (i.e., directly follows from) the last TSN received/processed by SCTP load balancer 218 for association X (block 508). If not, this means that the current SCTP packet has been received "out-of-order," and thus packet receive module 602 can place the SCTP packet in packet reorder queue 606(X) so that it may be processed at a later point in time once the intervening packets for association X have arrived and have been processed (block 510). Flowchart 500 can then return to block 502.

However, if the TSN of the first chunk of the SCTP does have continuity with the last TSN for association X, packet receive module 602 can enqueue the SCTP packet to packet queue 604(X) (block 512), enqueue the data chunks in the SCTP packet, in TSN order, to data chunk queue 608(X) (block 514), and pass any control chunks in the SCTP packets to a control chunk processor 610 for handling (block 516). Although not explicitly shown in flowchart 500, control chunk processor 610 can handle certain types of control chunks as indicated below:

INIT or INIT_ACK control chunk: processor 610 extracts endpoint IP address, starting TSN in each uplink/downlink flow, max number of streams that can be supported on each uplink/downlink flow and associates this information with association X in an association table 612

SACK control chunk: processor 610 sends signal to stream processor 614 to consume packets with TSNs acknowledged by SACK chunk Shutdown, shutdown ACK, or shutdown complete control chunk: processor 610 removes entry for association X from association table 612

Abort or error control chunk: processor 610 handles errors in connection

Note that, as part of enqueuing data chunks to data chunk queue 608 at block 514, packet receive module 602 can read from association table 612 to retrieve a pointer to queue 608.

At block 518, stream processor 614 can receive a signal from control chunk processor 610 indicating how many received SCTP packets it can consume (as noted above with respect to the SACK control chunk). In response, stream processor 614 can dequeue the data chunks for those packets from data chunk queue(s) 608, de-multiplex the data chunks based on each chunk's SID, and enqueue the de-mutiplexed data chunks into a number of stream queues 616 (block 520). In this way, stream processor 614 can separate out the data chunks on a per-stream basis. As part of this process, stream processor 614 can cause the data chunks that have been dequeued from data chunk queue(s) 608 to be deleted from the corresponding packet queue(s) 604.

Further, as part of adding data chunks to stream queues 616, stream processor 614 can check the message boundaries defined the data chunks. Upon encountering the presence of the "E" bit for a given sequence of data chunks indicating a complete SCTP message, stream processor 614 can trigger a message decoder module 618 (block 522).

In response to being triggered, message decoder module 618 can parse the SCTP message using a protocol parser that is appropriate for the message (e.g., Diameter, S6a, S1AP, etc.) and can extract information from the message that is relevant to the state of the communication session to which the message belongs (block 524). In the case of a mobile user session, this information can include, e.g., user (IMSI) details, user equipment (IMEI) details, and more. Message decoder module 618 can store this state information in a state/session table 620 in order to track the states of ongoing communication sessions.

Then, at block 526, message decoder module 618 can consult an egress configuration table 622 for user-defined load balancing rules/criteria that indicate how the current message should be distributed to the egress ports of packet broker 206 (and thus, to probes/tools 208) in view of the information determined/extracted at block 524. Note that these rules/criteria are completely user-configurable and can correspond to various types of load balancing algorithms such as IMSI-based round robin, message level round robin, etc. The end result of block 526 is that message decoder module 618 can determine a specific mapping between the message and one or more specific egress ports of packet broker 206.

At block 528, message decoder module 618 can pass the message and the mapped egress port(s) to an SCTP transmit module 624. SCTP transmit module 624 can maintain pre-opened SCTP associations between packet broker 206 and each probe/tool 208. Finally, at block 530, SCTP transmit module 624 can package the message into a new SCTP packet and transmit the newly created SCTP packet with the message out of the egress port towards a probe/tool 208.

It should be appreciated that flowchart 500 and packet flow 600 of FIGS. 5 and 6 are illustrative and various modifications are possible. For example, although the preceding description suggests that each data chunk queue 608 maintains an actual copy of the data chunks for packets added to the packet queue 604, in some embodiments each data chunk queue 608 may simply comprise pointers to the packet queue (which holds the actual data chunk data). This approach can reduce the memory footprint of the solution.

Further, while message decoder module 618 can track protocol state information and use this information to direct the load balancing process as noted above, in some embodiments module 618 may not do so. Instead, message decoder module 618 may simply decode SCTP parameters (e.g., message boundaries, stream IDs, etc.) and apply these SCTP parameters for load balancing purposes. One of ordinary skill in the art will recognize other variations, modifications, and alternatives.

5. Packet Preserving SCTP Load Balancing

Figure 7:
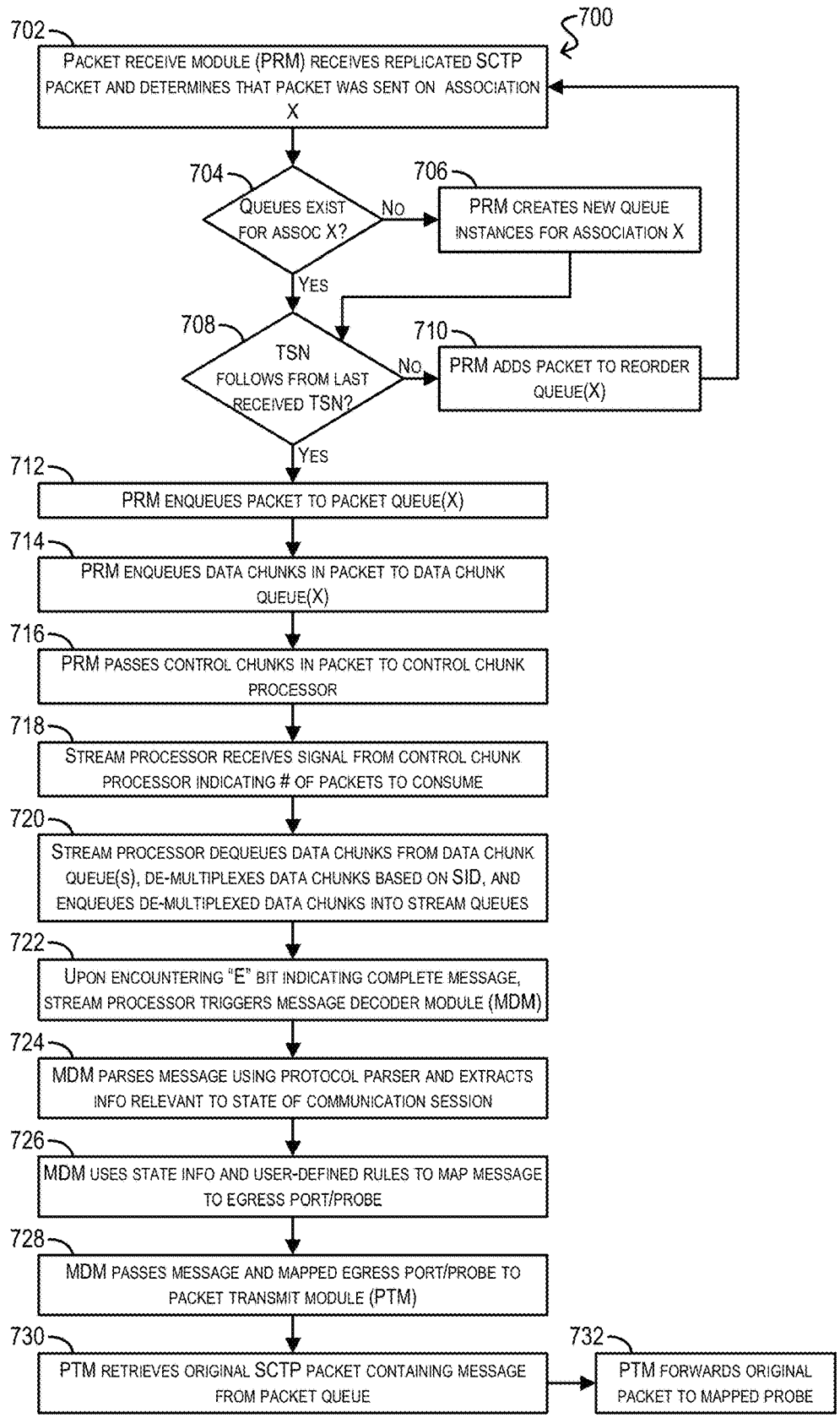
FIGS. 7 and 8 depict a flowchart and a packet flow for performing packet preserving SCTP load balancing according to an embodiment.

As noted previously, as an alternative to the packet modifying approach of section (4), SCTP load balancer can implement a "packet preserving" approach for performing intelligent load balancing of SCTP traffic. A flowchart 700 and a packet flow 800 for this packet preserving approach are presented in FIGS. 7 and 8 respectively and described below. At a high level, the packet preserving approach is similar to the packet modifying approach but is designed to forward load balanced SCTP messages to probes/tools 208 in the form of the original SCTP packets received at packet broker 206 (rather than in the form of newly created SCTP packets). Thus, with this approach, there is no need to open SCTP associations between packet broker 206 and probes/tools 208.

Blocks 702-726 of flowchart 700 are generally similar to blocks 502-526 of flowchart 500, with the caveat that stream processor 614 does not delete packets from the packet queues upon enqueuing data chunks to the stream queues. Instead, stream processor 614 can insert a reference counter into each packet in packet queue 604 indicating the number of complete messages included in that packet.

Figure 8:
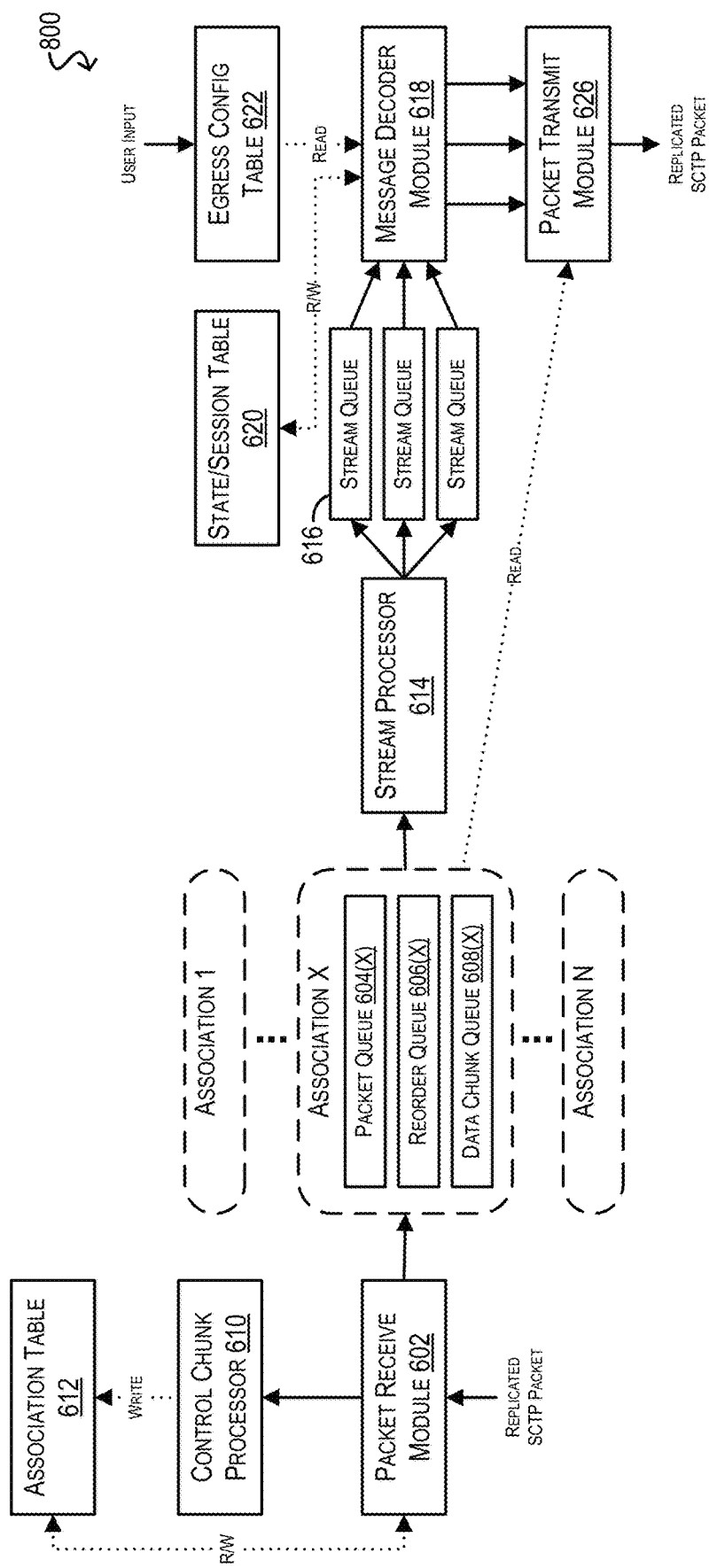

At block 728, a packet transmit module 626 that is shown in FIG. 8 (rather than SCTP transmit module 624) can receive the message and mapped egress port(s) from message decoder module 618. Then, at block 730, packet transmit module 626 can retrieve the original SCTP packet(s) corresponding to the message from packet queue(s) 604. Finally, at block 732, packet transmit module 626 can forward the original SCTP packet(s) as-is out of the mapped egress port(s) towards one or more probes/tools 208. Note that if a given packet contains multiple messages that are mapped to different egress ports, packet transmit module 626 can forward the packet multiple times (one for each different egress port).

6. Example Network Device

Figure 9:
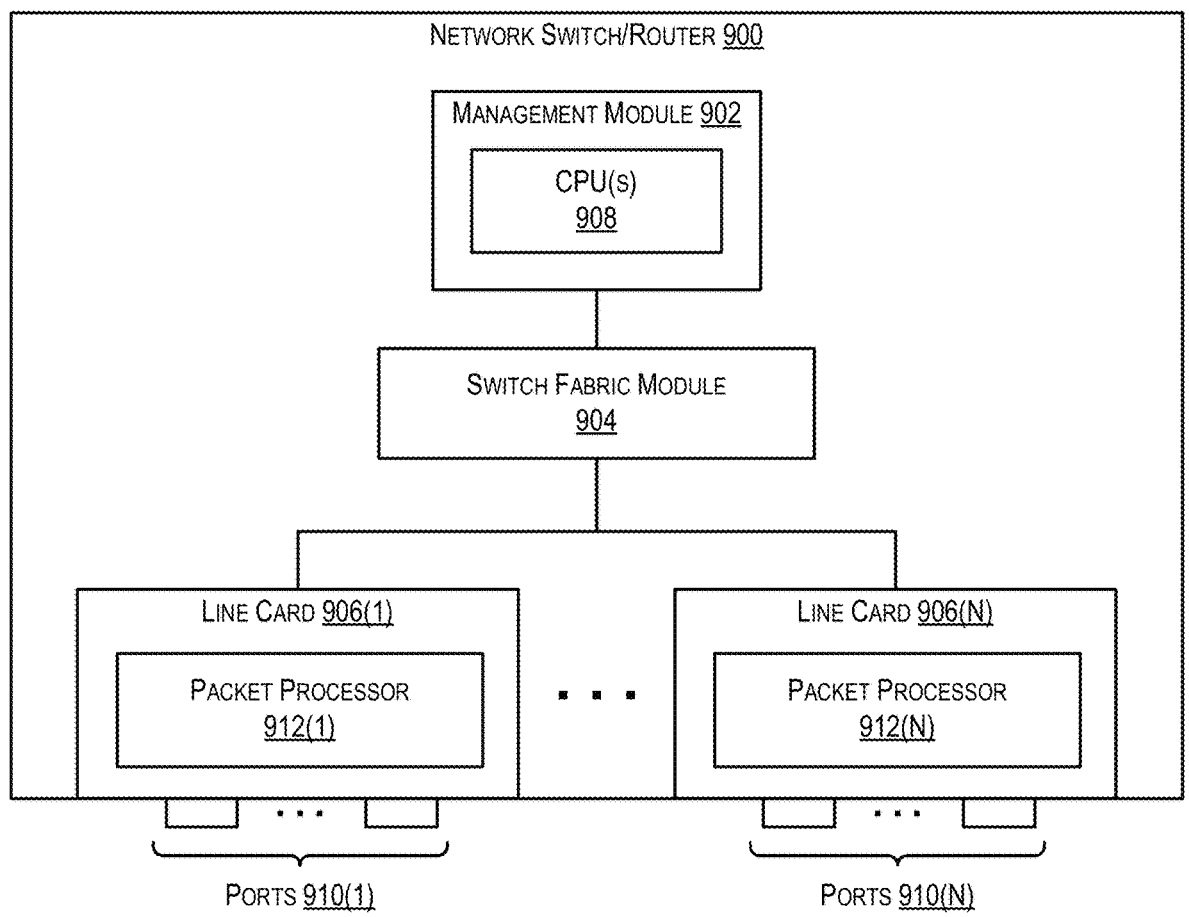
FIG. 9 depicts an example network switch/router according to an embodiment.

FIG. 9 depicts an example network device (e.g., switch/router) 900 according to an embodiment. Network switch/router 900 can be used to implement packet broker 206/SCTP load balancer 218 (or a portion thereof) according to an embodiment.

As shown, network switch/router 900 includes a management module 902, a switch fabric module 904, and a number of line cards 906(1)-906(N). Management module 902 includes one or more management CPUs 908 for managing/controlling the operation of the device. Each management CPU 908 can be a general purpose processor, such as a PowerPC, Intel, AMD, or ARM-based processor, that operates under the control of software stored in an associated memory (not shown).

Switch fabric module 904 and line cards 906(1)-906(N) collectively represent the data, or forwarding, plane of network switch/router 900. Switch fabric module 904 is configured to interconnect the various other modules of network switch/router 900. Each line card 906(1)-906(N) can include one or more ingress/egress ports 910(1)-910(N) that are used by network switch/router 900 to send and receive packets. Each line card 906(1)-906(N) can also include a packet processor 912(1)-912(N). Packet processor 912(1)-912(N) is a hardware processing component (e.g., an FPGA or ASIC) that can make wire speed decisions on how to handle incoming or outgoing traffic.

It should be appreciated that network switch/router 900 is illustrative and not intended to limit embodiments of the present invention. Many other configurations having more or fewer components than switch/router 900 are possible.

7. Example Computer System

Figure 10:
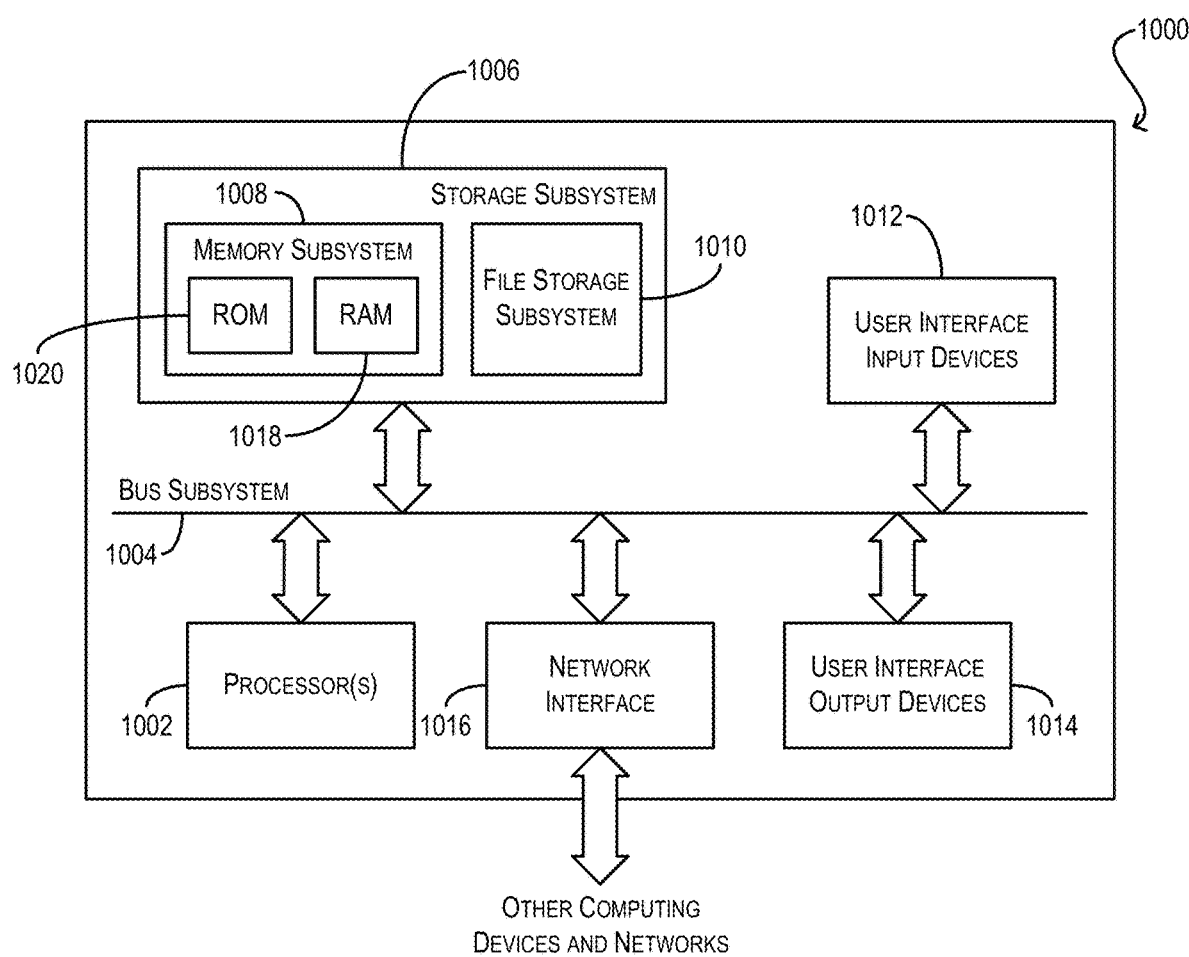
FIG. 10 depicts an example computer system according to an embodiment.

FIG. 10 depicts an example computer system 1000 according to an embodiment. Computer system 900 can be used to implement packet broker 206/SCTP load balancer 218 (or a portion thereof) according to an embodiment.

As shown in FIG. 10, computer system 1000 can include one or more general purpose processors (e.g., CPUs) 1002 that communicate with a number of peripheral devices via a bus subsystem 1004. These peripheral devices can include a storage subsystem 1006 (comprising a memory subsystem 1008 and a file storage subsystem 1010), user interface input devices 1012, user interface output devices 1014, and a network interface subsystem 1016.

Bus subsystem 1004 can provide a mechanism for letting the various components and subsystems of computer system 1000 communicate with each other as intended. Although bus subsystem 1004 is shown schematically as a single bus, alternative embodiments of the bus subsystem can utilize multiple buses.

Network interface subsystem 1016 can serve as an interface for communicating data between computer system 1000 and other computing devices or networks. Embodiments of network interface subsystem 1016 can include wired (e.g., coaxial, twisted pair, or fiber optic Ethernet) and/or wireless (e.g., Wi-Fi, cellular, Bluetooth, etc.) interfaces.

User interface input devices 1012 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 1000.

User interface output devices 1014 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 1000.

Storage subsystem 1006 can include a memory subsystem 1008 and a file/disk storage subsystem 1010. Subsystems 1008 and 1010 represent non-transitory computer-readable storage media that can store program code and/or data that provide the functionality of various embodiments described herein.

Memory subsystem 1008 can include a number of memories including a main random access memory (RAM) 1018 for storage of instructions and data during program execution and a read-only memory (ROM) 1020 in which fixed instructions are stored. File storage subsystem 1010 can provide persistent (i.e., nonvolatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and not intended to limit embodiments of the present disclosure. Many other configurations having more or fewer components than computer system 1000 are possible.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
receiving, by a load balancer, a Stream Control Transmission Protocol (SCTP) packet that has been replicated from a network being monitored, wherein the SCTP packet comprises a plurality of data chunks;
recovering, by the load balancer, a SCTP message from the SCTP packet, wherein the SCTP message comprises one or more data chunks from the plurality of data chunks and wherein a data chunk of the one or more data chunks includes a defined message boundary and wherein recovering the SCTP message comprises:
determining an SCTP association for the SCTP packet;
selecting a packet queue and a data chunk queue based on the SCTP association;
placing the SCTP packet into the packet queue;
placing the plurality of data chunks into the data chunk queue;
passing the one or more data chunks from the data chunk queue to a stream queue in response to a control chunk in the SCTP packet; and
detecting the defined message boundary in the data chunk of the one or more data chunks which indicates that the SCTP message is available in the stream queue;
extracting, by a message decoder module, session state information from the recovered SCTP message;
mapping, by the message decoder module, the recovered SCTP message to an egress port based at least in part on the session state information and one or more rules;
transmitting, by the load balancer, the recovered SCTP message out of the egress port towards an analytic probe or tool for analysis.

2. The method of claim 1 wherein the passing the one or more data chunks from the data chunk queue to the stream queue comprises:

de-multiplexing the plurality of data chunks into the stream queue based on a stream identifier included in each data chunk.

3. The method of claim 2 wherein the defined message boundary is a bit and wherein the recovering further comprises:
identifying the bit in one of the plurality of data chunks that indicates an entirety of the SCTP message has been received.

4. The method of claim 1, further comprising:
receiving, by the load balancer, another SCTP packet that has been replicated from the network being monitored, wherein the session state information comprises application protocol parameters pertaining to a state of a same communication session to which the SCTP message and the another SCTP message belong; and
recovering, by the load balancer, another SCTP message from the another SCTP packet.

5. The method of claim 4 further comprising:
saving the application protocol parameters to a session table of the load balancer.

6. The method of claim 1 wherein the session state information comprises SCTP-specific parameters.

7. The method of claim 1 wherein the one or more rules comprise load balancing logic indicating how to distribute other SCTP messages to other egress ports of the load balancer based on session state information extracted from the other SCTP messages.

8. The method of claim 7 wherein the load balancing logic is user-defined.

9. The method of claim 1 wherein the transmitting comprises:
packaging the SCTP message into a newly constructed SCTP packet; and
transmitting the newly constructed SCTP packet over a pre-opened SCTP association to the analytic probe or tool.

10. The method of claim 1 wherein the transmitting comprises:
retrieving, from the packet queue, an original copy of the SCTP packet received by the load balancer that contains the SCTP message; and
forwarding the original copy of the SCTP packet out of the egress port towards the analytic probe or tool.

11. The method of claim 1, further comprising:
receiving, by the load balancer, another SCTP packet that has been replicated from the network being monitored, wherein the SCTP packet and the another SCTP packet originate from different SCTP associations in the network being monitored.

12. The method of claim 1 further comprising:
identifying one or more control chunks in the SCTP packet; and
passing the one or more control chunks to a control chunk processor of the load balancer for handling, without forwarding the one or more control chunks to the analytic probe or tool.

13. The method of claim 1 wherein the network being monitored is a mobile network.

14. The method of claim 1 wherein the load balancer is part of a packet broker implemented in a visibility network.

15. A non-transitory computer readable storage medium having stored thereon program code that when executed by a load balancer processor cause the load balancer processor to perform operations comprising:
receiving a Stream Control Transmission Protocol (SCTP) packet that has been replicated from a network being monitored, wherein the SCTP packet comprises a plurality of data chunks;
recovering a SCTP message from the SCTP packet, wherein the SCTP message comprises one or more data chunks from the plurality of data chunks and wherein a data chunk of the one or more data chunks includes a defined message boundary and wherein recovering the SCTP message comprises:
determining an SCTP association for the SCTP packet;
selecting a packet queue and a data chunk queue based on the SCTP association;
placing the SCTP packet into the packet queue;
placing the plurality of data chunks into the data chunk queue;
passing the one or more data chunks from the data chunk queue to a stream queue in response to a control chunk in the SCTP packet; and
detecting the defined message boundary in the data chunk of the one or more data chunks which indicates that the SCTP message is available in the stream queue;
extracting, by a message decoder module in the load balancer processor, session state information from the recovered SCTP message;
mapping, by the message decoder module in the load balancer processor, the recovered SCTP message to an egress port based at least in part on the session state information and one or more rules; and
transmitting the recovered SCTP message out of the egress port towards an analytic probe or tool for analysis.

16. The non-transitory computer readable storage medium of claim 15 wherein the operations further comprises:
packaging the recovered SCTP message into a newly constructed SCTP packet; and
transmitting the newly constructed SCTP packet over a pre-opened SCTP association to the analytic probe or tool.

17. The non-transitory computer readable storage medium of claim 15 wherein the operations further comprises:
retrieving, from the packet queue, an original copy of the SCTP packet received by the load balancer processor that contains the SCTP message; and
forwarding the original copy of the SCTP packet out of the egress port towards the analytic probe or tool.

18. A load balancing system comprising:
a processor; and
a non-transitory computer readable medium having stored thereon program code that, when executed by the processor, causes the processor to:
receive a Stream Control Transmission Protocol (SCTP) packets that has been replicated from a network being monitored, wherein the SCTP packet comprises a plurality of data chunks;
recover a SCTP message from the SCTP packets, wherein the SCTP message comprises one or more data chunks from the plurality of data chunks and wherein the SCTP message is defined by a defined message boundary and wherein recovering the SCTP message comprises:
determine an SCTP association for the SCTP packet;
select a packet queue and a data chunk queue based on the SCTP association;
placing the SCTP packet into the packet queue;

placing the plurality of data chunks into the data chunk queue;

passing the one or more data chunks from the data chunk queue to a stream queue in response to a control chunk in the SCTP packet; and detect the defined message boundary in a data chunk of the one or more data chunks which indicates that the SCTP message is available in the stream queue;

extract, by a message decoder module in the load balancing system, session state information from the recovered SCTP message;

map the recovered SCTP message to an egress port based at least in part on the first session state information and one or more rules; and transmit the recovered SCTP message out of the egress port towards an analytic probe or tool for analysis.

19. The load balancing system of claim 18 wherein the program code that causes the processor to transmit the recovered SCTP message comprises program code that causes the processor to:

package the recovered SCTP message into a newly constructed SCTP packet; and transmit the newly constructed SCTP packet over a pre-opened SCTP association to the analytic probe or tool.

20. The load balancing system of claim 18 wherein the program code that causes the processor to transmit the recovered SCTP message comprises program code that causes the processor to:

retrieve, from the packet queue, an original copy of the SCTP packet received by the load balancing system that contains the SCTP message; and forward the original copy of the SCTP packet out of the egress port towards the analytic probe or tool.

* * * * *